US008804205B2

(12) United States Patent
Ishii et al.

(10) Patent No.: US 8,804,205 B2
(45) Date of Patent: Aug. 12, 2014

(54) IMAGE PROCESSING APPARATUS, METHOD, AND COMPUTER PROGRAM PRODUCT FOR CONVERTING IMAGE DATA

(75) Inventors: Masato Ishii, Kanagawa (JP); Taira Matsuoka, Saitama (JP)

(73) Assignee: Ricoh Company, Limited, Tokyo (JP)

( * ) Notice: Subject to any disclaimer, the term of this patent is extended or adjusted under 35 U.S.C. 154(b) by 846 days.

(21) Appl. No.: 12/926,472

(22) Filed: Nov. 19, 2010

(65) Prior Publication Data

US 2011/0122456 A1    May 26, 2011

(30) Foreign Application Priority Data

Nov. 20, 2009  (JP) ................................. 2009-265105
Oct. 13, 2010  (JP) ................................. 2010-230845

(51) Int. Cl.
*H04N 1/40* (2006.01)

(52) U.S. Cl.
USPC ............ 358/448; 358/1.9; 358/474; 358/505; 358/512; 358/515; 358/517; 358/518; 358/521; 358/532; 382/254; 382/275; 382/167

(58) Field of Classification Search
None
See application file for complete search history.

(56) References Cited

U.S. PATENT DOCUMENTS

| 6,655,861 | B2 | 12/2003 | Yamakawa |
| 2002/0031276 | A1 * | 3/2002 | Yagishita et al. ............. 382/252 |
| 2003/0035673 | A1 * | 2/2003 | Yamakawa ...................... 400/76 |
| 2009/0097072 | A1 * | 4/2009 | Tamura ........................ 358/3.01 |
| 2009/0213396 | A1 * | 8/2009 | Togami ............................ 358/1.9 |
| 2009/0237686 | A1 * | 9/2009 | Yoshida et al. ................ 358/1.9 |
| 2011/0122456 | A1 * | 5/2011 | Ishii et al. ..................... 358/448 |

FOREIGN PATENT DOCUMENTS

| JP | 2000-315258 | 11/2000 |
| JP | 3313592 | 5/2002 |
| JP | 3530324 | 3/2004 |
| JP | 2005-117290 | 4/2005 |
| JP | 2005-168044 | 6/2005 |
| JP | 3767210 | 2/2006 |
| JP | 3983101 | 7/2007 |
| JP | 2007-251835 | 9/2007 |
| JP | 2007-325128 | 12/2007 |

OTHER PUBLICATIONS

JP 10-126631 Published on May 15, 1998.
JP 10-145623 Published on May 29, 1998.
JP 2000-151997 Published on May 30, 2000.
JP 2003-046772 Published on Feb. 14, 2003.

* cited by examiner

*Primary Examiner* — Miya J Cato
(74) *Attorney, Agent, or Firm* — Harness, Dickey & Pierce, P.L.C.

(57) ABSTRACT

An image processing apparatus includes: a memory unit; a read-out image processing unit that performs read-out image processing on input image data and stores the image data on which the image processing has been performed in the memory unit; an output attribute determining unit that performs determination image processing on the image data stored in the memory unit and determines an attribute of the image data on which the determination image processing has been performed; an output image processing unit that performs output image processing on the image data according to the determined attribute; and an output unit that outputs the image data on which the output image processing has been performed by the output image processing unit.

12 Claims, 15 Drawing Sheets

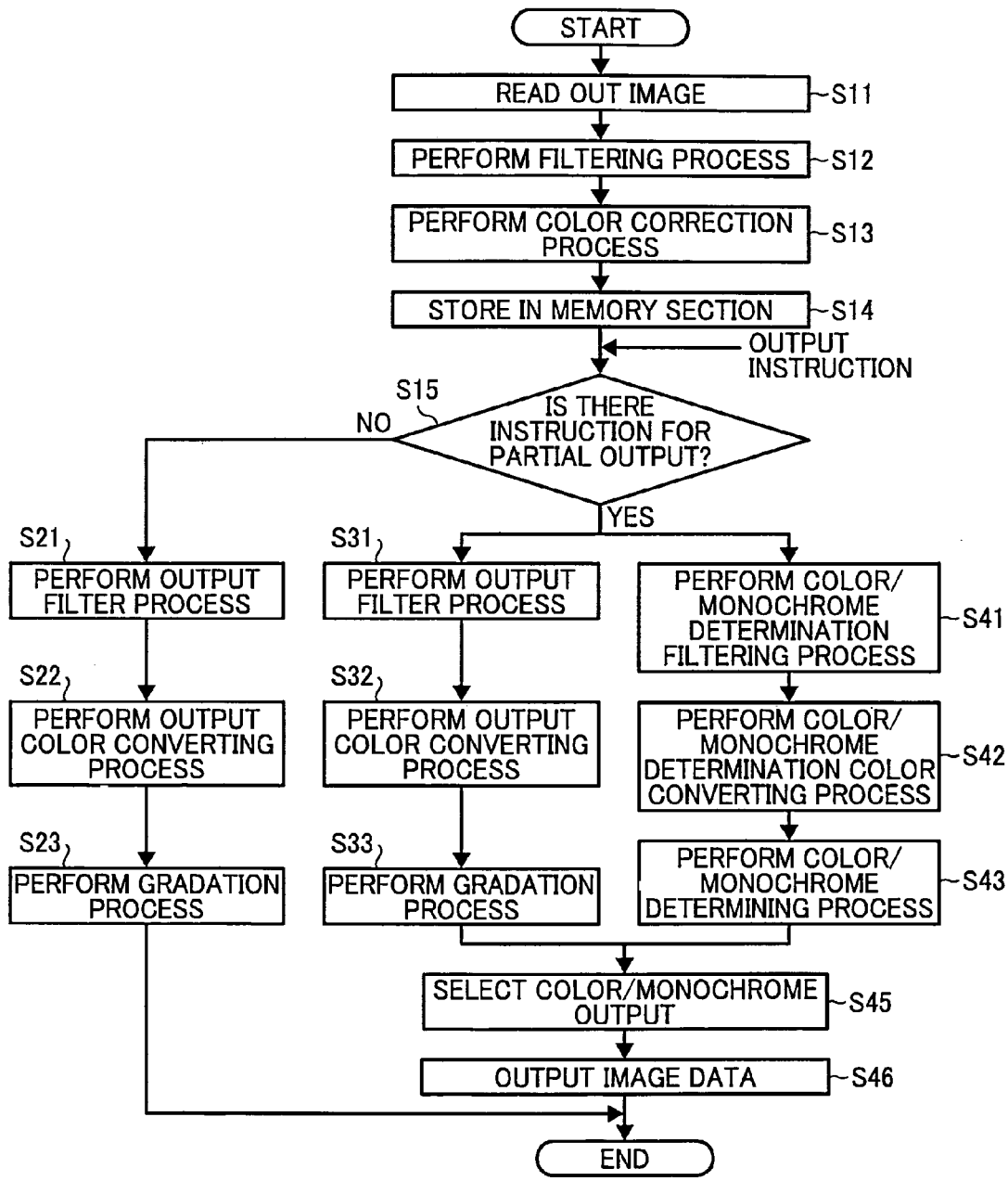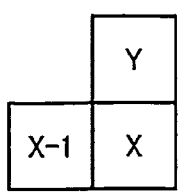

FIG. 5A

|   |   |   |   |   |   |   |   |   |   |
|---|---|---|---|---|---|---|---|---|---|
|   |   |   |   |   |   |   |   |   |   |
|   |   | O | O | O | O | O | O | O |   |
|   | O | O | O | O | O | O | O | O | O |
|   | O | O |   |   |   |   |   | O | O |
|   | O | O |   |   |   |   |   | O | O |
|   | O | O |   |   |   |   |   | O | O |
|   | O | O |   |   |   |   |   | O | O |
|   | O | O | O | O | O | O | O | O | O |
|   |   | O | O | O | O | O | O | O |   |
|   |   |   |   |   |   |   |   |   |   |

O : COLOR DETERMINATION

FIG. 5B

|   |   |   |   |   |   |   |   |   |   |
|---|---|---|---|---|---|---|---|---|---|
|   |   |   |   |   |   |   |   |   |   |
|   |   | 1 | 2 | 3 | 4 | 5 | 6 | 7 |   |
|   | 1 | 3 | 5 | 7 | 9 | 11 | 13 | 15 | 16 |
|   | 2 | 5 |   |   |   |   |   | 17 | 18 |
|   | 3 | 7 |   |   |   |   |   | 19 | 20 |
|   | 4 | 9 |   |   |   |   |   | 21 | 22 |
|   | 5 | 11 |   |   |   |   |   | 22 | 23 |
|   | 6 | 13 | 15 | 17 | 19 | 21 | 23 | 24 | 25 |
|   |   | 14 | 16 | 18 | 20 | 22 | 24 | 25 |   |
|   |   |   |   |   |   |   |   |   |   |

| a1 | a2 | a3 | a2 | a1 |
|----|----|----|----|----|
| b1 | b2 | b3 | b2 | b1 |
| c1 | c2 | M  | c2 | c1 |
| b1 | b2 | b3 | b2 | b1 |
| a1 | a2 | a2 | a2 | a1 |

FIG. 11

| 0 | 0 | 0   | 0   | 0   | 0   | 0   | 0   | 0   | 0 | 0 |
|---|---|-----|-----|-----|-----|-----|-----|-----|---|---|
| 0 | 0 | 0   | 0   | 0   | 0   | 0   | 0   | 0   | 0 | 0 |
| 0 | 0 | 0   | 0   | 0   | 0   | 0   | 0   | 0   | 0 | 0 |
| 0 | 0 | 0   | 0   | 0   | 0   | 0   | 0   | 0   | 0 | 0 |
| 0 | 0 | 0   | 0   | 0   | 0   | 0   | 0   | 0   | 0 | 0 |
| 0 | 0 | 0   | 0   | 0   | 0   | 0   | 0   | 0   | 0 | 0 |
| 0 | 0 | 0   | 0   | 0   | 0   | 0   | 0   | 0   | 0 | 0 |
| 0 | 0 | 0   | 0   | 0   | 0   | 0   | 0   | 0   | 0 | 0 |
| 0 | 0 | 0   | 0   | 0   | 0   | 0   | 0   | 0   | 0 | 0 |
| 0 | 0 | 128 | 128 | 128 | 128 | 128 | 128 | 128 | 0 | 0 |
| 0 | 0 | 0   | 0   | 0   | 0   | 0   | 0   | 0   | 0 | 0 |
| 0 | 0 | 0   | 0   | 0   | 0   | 0   | 0   | 0   | 0 | 0 |
| 0 | 0 | 128 | 128 | 128 | 128 | 128 | 128 | 128 | 0 | 0 |
| 0 | 0 | 128 | 128 | 128 | 128 | 128 | 128 | 128 | 0 | 0 |
| 0 | 0 | 128 | 128 | 128 | 128 | 128 | 128 | 128 | 0 | 0 |
| 0 | 0 | 128 | 128 | 128 | 128 | 128 | 128 | 128 | 0 | 0 |
| 0 | 0 | 128 | 128 | 128 | 128 | 128 | 128 | 128 | 0 | 0 |
| 0 | 0 | 128 | 128 | 128 | 128 | 128 | 128 | 128 | 0 | 0 |
| 0 | 0 | 128 | 128 | 128 | 128 | 128 | 128 | 128 | 0 | 0 |
| 0 | 0 | 128 | 128 | 128 | 128 | 128 | 128 | 128 | 0 | 0 |
| 0 | 0 | 0   | 0   | 0   | 0   | 0   | 0   | 0   | 0 | 0 |
| 0 | 0 | 0   | 0   | 0   | 0   | 0   | 0   | 0   | 0 | 0 |
| 0 | 0 | 128 | 128 | 128 | 128 | 128 | 128 | 128 | 0 | 0 |
| 0 | 0 | 0   | 0   | 0   | 0   | 0   | 0   | 0   | 0 | 0 |
| 0 | 0 | 0   | 0   | 0   | 0   | 0   | 0   | 0   | 0 | 0 |
| 0 | 0 | 0   | 0   | 0   | 0   | 0   | 0   | 0   | 0 | 0 |
| 0 | 0 | 0   | 0   | 0   | 0   | 0   | 0   | 0   | 0 | 0 |
| 0 | 0 | 0   | 0   | 0   | 0   | 0   | 0   | 0   | 0 | 0 |
| 0 | 0 | 0   | 0   | 0   | 0   | 0   | 0   | 0   | 0 | 0 |
| 0 | 0 | 0   | 0   | 0   | 0   | 0   | 0   | 0   | 0 | 0 |
| 0 | 0 | 0   | 0   | 0   | 0   | 0   | 0   | 0   | 0 | 0 |

FIG. 12

| 0.01 | 0.01 | 0.01 | 0.01 | 0.01 |
|------|------|------|------|------|
| 0.01 | 0.01 | 0.01 | 0.01 | 0.01 |
| 0.01 | 0.01 | 0.76 | 0.01 | 0.01 |
| 0.01 | 0.01 | 0.01 | 0.01 | 0.01 |
| 0.01 | 0.01 | 0.01 | 0.01 | 0.01 |

FIG. 13

| | | | | | | | | | | |
|---|---|---|---|---|---|---|---|---|---|---|
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 1 | 3 | 4 | 5 | 6 | 6 | 6 | 5 | 4 | 3 | 1 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 3 | 5 | 8 | 10 | 13 | 13 | 13 | 10 | 8 | 5 | 3 |
| 1 | 3 | 4 | 5 | 6 | 6 | 6 | 5 | 4 | 3 | 1 |
| 1 | 3 | 4 | 5 | 6 | 6 | 6 | 5 | 4 | 3 | 1 |
| 4 | 8 | 108 | 111 | 115 | 115 | 115 | 111 | 108 | 8 | 4 |
| 3 | 5 | 8 | 10 | 13 | 13 | 13 | 10 | 8 | 5 | 3 |
| 3 | 5 | 8 | 10 | 13 | 13 | 13 | 10 | 8 | 5 | 3 |
| 5 | 10 | 111 | 116 | 122 | 122 | 122 | 116 | 111 | 10 | 5 |
| 4 | 8 | 108 | 111 | 115 | 115 | 115 | 111 | 108 | 8 | 4 |
| 4 | 8 | 108 | 111 | 115 | 115 | 115 | 111 | 108 | 8 | 4 |
| 5 | 10 | 111 | 116 | 122 | 122 | 122 | 116 | 111 | 10 | 5 |
| 4 | 8 | 108 | 111 | 115 | 115 | 115 | 111 | 108 | 8 | 4 |
| 5 | 10 | 111 | 116 | 122 | 122 | 122 | 116 | 111 | 10 | 5 |
| 4 | 8 | 108 | 111 | 115 | 115 | 115 | 111 | 108 | 8 | 4 |
| 4 | 8 | 108 | 111 | 115 | 115 | 115 | 111 | 108 | 8 | 4 |
| 5 | 10 | 111 | 116 | 122 | 122 | 122 | 116 | 111 | 10 | 5 |
| 3 | 5 | 8 | 10 | 13 | 13 | 13 | 10 | 8 | 5 | 3 |
| 3 | 5 | 8 | 10 | 13 | 13 | 13 | 10 | 8 | 5 | 3 |
| 4 | 8 | 108 | 111 | 115 | 115 | 115 | 111 | 108 | 8 | 4 |
| 1 | 3 | 4 | 5 | 6 | 6 | 6 | 5 | 4 | 3 | 1 |
| 1 | 3 | 4 | 5 | 6 | 6 | 6 | 5 | 4 | 3 | 1 |
| 3 | 5 | 8 | 10 | 13 | 13 | 13 | 10 | 8 | 5 | 3 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 1 | 3 | 4 | 5 | 6 | 6 | 6 | 5 | 4 | 3 | 1 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |

FIG. 14

| | | | | |
|---|---|---|---|---|
| -0.02 | 0 | -0.02 | 0 | -0.02 |
| 0 | -0.02 | 0 | -0.02 | 0 |
| -0.02 | 0 | 0.24 | 0 | -0.02 |
| 0 | -0.02 | 0 | -0.02 | 0 |
| -0.02 | 0 | -0.02 | 0 | -0.02 |

FIG. 15

| 0 | 0 | 0 | 0 | 0 | 0 | 0 | 0 | 0 | 0 | 0 |
|---|---|---|---|---|---|---|---|---|---|---|
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 1 | 1 | 1 | 1 | 1 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 1 | 2 | 3 | 4 | 4 | 4 | 3 | 2 | 1 | 0 |
| 0 | 0 | 0 | 1 | 1 | 0 | 1 | 1 | 0 | 0 | 0 |
| 0 | 0 | 0 | 1 | 1 | 0 | 1 | 1 | 0 | 0 | 0 |
| 0 | 2 | 123 | 125 | 126 | 126 | 126 | 125 | 123 | 2 | 0 |
| 1 | 1 | 2 | 3 | 4 | 4 | 4 | 3 | 2 | 1 | 1 |
| 0 | 1 | 2 | 3 | 4 | 4 | 4 | 3 | 2 | 1 | 0 |
| 1 | 3 | 126 | 127 | 129 | 129 | 129 | 127 | 126 | 3 | 1 |
| 0 | 2 | 123 | 126 | 126 | 126 | 126 | 126 | 123 | 2 | 0 |
| 0 | 2 | 123 | 125 | 126 | 126 | 126 | 125 | 123 | 2 | 0 |
| 1 | 3 | 126 | 127 | 129 | 129 | 129 | 127 | 126 | 3 | 1 |
| 2 | 2 | 125 | 126 | 128 | 128 | 129 | 126 | 125 | 2 | 2 |
| 1 | 3 | 126 | 127 | 129 | 129 | 129 | 127 | 126 | 3 | 1 |
| 0 | 2 | 123 | 125 | 126 | 126 | 126 | 125 | 123 | 2 | 0 |
| 0 | 2 | 123 | 126 | 126 | 126 | 126 | 126 | 123 | 2 | 0 |
| 1 | 3 | 126 | 127 | 129 | 129 | 129 | 127 | 126 | 3 | 1 |
| 0 | 1 | 2 | 3 | 4 | 4 | 4 | 3 | 2 | 1 | 0 |
| 1 | 1 | 2 | 3 | 4 | 4 | 4 | 3 | 2 | 1 | 1 |
| 0 | 2 | 123 | 125 | 126 | 126 | 126 | 125 | 123 | 2 | 0 |
| 0 | 0 | 0 | 1 | 1 | 0 | 1 | 1 | 0 | 0 | 0 |
| 0 | 0 | 0 | 1 | 1 | 0 | 1 | 1 | 0 | 0 | 0 |
| 0 | 1 | 2 | 3 | 4 | 4 | 4 | 3 | 2 | 1 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 1 | 1 | 0 | 1 | 1 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |
| 0 | 0 | 0 | 0 | 0 | 0 | 0 | 0 | 0 | 0 | 0 |

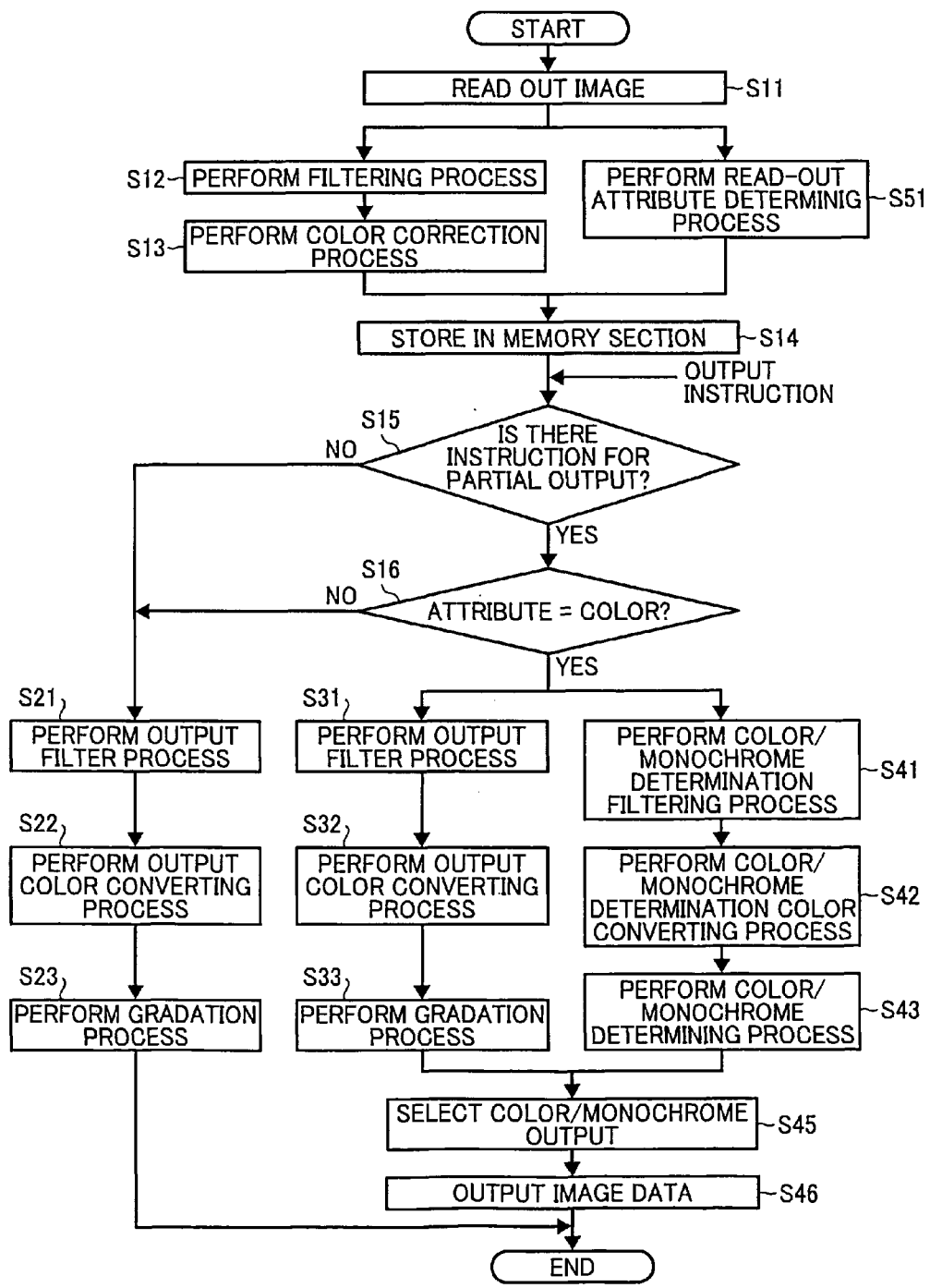

IMAGE PROCESSING APPARATUS, METHOD, AND COMPUTER PROGRAM PRODUCT FOR CONVERTING IMAGE DATA

CROSS-REFERENCE TO RELATED APPLICATIONS

The present application claims priority to and incorporates by reference the entire contents of Japanese Patent Application No. 2009-265105 filed in Japan on Nov. 20, 2009 and Japanese Patent Application No 2010-230845 filed in Japan on Oct. 13, 2010.

BACKGROUND OF THE INVENTION

1. Field of the Invention

The present invention relates to an image processing apparatus, an image processing method, and a computer program product.

2. Description of the Related Art

The invention relates to an image processing method and an image processing apparatus for converting input image data acquired by image reading, image capturing, or the like into suitable output image data to be output onto an image output medium through attribute determination. For example, although there is no intention to limit the invention, the invention can be applied to a multi-function printer (MFP) having not only a printing function but also a document reading function, a copy function, and a facsimile function.

Examples of the attribute determination include an image form determination (an image classification determination) for determining whether the image data represents a text document, a photograph document, a text and photograph document, or a white document and a color/monochrome determination (chromatic color/achromatic color determination) for determining whether an image is color (chromatic) or monochrome (achromatic).

MFPs employ an automatic color selection (ACS) technology for determining whether a document is a color document or a monochrome document. Some digital color copiers having only a copy function or ones further having a printer function in addition to a copy function also have the ACS function built therein. Although it is general that the ACS is performed at the time of scanning, there are also patent documents disclosing alternative ways, for example, in which the ACS determination is performed after color conversion into an output space or the ACS determination is performed after a magnification changing process or a filtering process depending on the output. Specific examples of such patent documents are as follows.

Japanese Patent Application Laid-open No. 2005-117290: An area designated by a specific color marker is converted into specified information and the information is output. The designation of an area with the color markers is performed in a predetermined form, and the predetermined form is recognized so as to be performed with a conversion process.

Japanese Patent Application Laid-open No. 2007-325128: When an ACS determination is performed, a magnification is changed according to the output size, and then an image area separating process (including the color/monochrome determination) is performed.

Japanese Patent Application Laid-open No. 2005-168044: After a device color space is converted into a uniform color space, the color/monochrome determination is performed.

Japanese Patent Application Laid-open No. 2007-251835: Included are a first image processing unit that processes and stores read-out images and a second image processing unit that processes the stored images and outputs the stored images.

Japanese Patent No. 3313592: A method of determining the document type of an ink jet document is described.

Japanese Patent No. 3530324: A method of determining the document type of a copied document is described.

Japanese Patent No. 3767210: A color/monochrome determination method for a document including characters on a colored background is described.

Japanese Patent Application Laid-open No. 2000-315258: A method of determining a map document is described.

Japanese Patent No. 3983101: A method of determining a text document, a text and photograph document, and a photograph document; an edge determination; a halftone dot determination; a gray determination; and a color determination (chromatic color/achromatic color determination) are described.

In an image forming process of a full-color copy mode in digital color copiers and MFPs, copy processes relating to four basic colors of Cyan (C), Magenta (M), Yellow (Y), and Black (Bk) are respectively performed, and such colors are copied onto one transfer sheet. In addition, when a copy process of a single-color copy mode is performed, an image of one color is copied onto a transfer sheet by performing one copy process.

Accordingly, in such types of copiers and MFPs, the amounts of toner used in a full color mode and in a single-color mode markedly differ from each other, and thus the cost required for user's copy markedly changes. In addition, since an image copied onto a transfer sheet markedly changes depending on the mode, the user needs to pay attention to switching between the color mode and the single-color mode (representatively, the monochrome mode). Therefore, the user should perform an operation of appropriately switching between the operation modes depending on the type of a document.

In order to resolve the inconvenience in such a type of switching between the modes, known is ACS in which it is automatically identified whether a document is a chromatic document or an achromatic document, and the operation mode of a copy process is automatically switched to a color mode or a monochrome mode in accordance with the result of the identification. However, when the color/monochrome determination in the ACS is erroneous, and particularly when a black-and-white document is incorrectly determined as a chromatic document, the output of the copy process is printed in four color plates of CMYBk. Therefore, the image copied onto a transfer sheet is greatly different from an image expected by the user, and the cost and time required for the copy process increase much. Accordingly, a highly accurate determination is demanded.

In addition, recently, a digital color copier not only is used as a signal unit but also is combined with a facsimile function, a printer function, a delivery scanner function, and the like due to an increase in the compatibility with other devices, and thus it is termed a multi-function printer (MFP). In addition, with increasing capacity and decreasing cost in a recording medium such as an HDD drive, a storage medium having high capacity has been built in the MFP. Thus, an image scanned once or an image that is input from other media can be accumulated in the high-capacity storage medium. Such accumulated images can be read out and re-used for the purposes that are different from those expected at the time when accumulated. For example, if images scanned by the scanner and images transmitted through the delivery scanner function are stored in an HDD, the images can be delivered to a place that is different from a first place or can be printed on paper sheets without reading out the document again by using the scanner. In addition, at the time of scanning, the original copy is replicated at an equal multiplication, and after that, the same document can be output to a paper sheet or the like as a 200% enlarged copy image.

As disclosed in Japanese Patent Application Laid-open No. 2007-251835, needed is a technology of accumulating the data scanned by the scanner to be in the state having high usability (generality or versatility), and reusing the accumulated images. Thus, it can be considered a case where the accumulated image is not used in the form of a simple image in the device space (scanner scanned RGB) but used in the form of a converted image in a certain uniform space (for example, sRGB). By accumulating the images in a uniform space, reuse of the information by using a different model and uniformity of the image quality can be achieved. In order to form a uniform space, for example, since the color correction process converts the device space into a uniform color space, a data compression process and a data expanding process are performed. In addition, by performing a filtering process, sharpening of an image, increasing of the resolving power, a moiré eliminating process, and the like are performed.

However, the above-described process is just a conversion process on the read-out image data (scanner scanned RGB) for image output. Thus, there are problems in that, for example, color deviation due to vibration of the scanner increases by performing an enhancement process or a smoothing process using a filter; the definition of gray balance becomes a definition according to the output destination by performing a color correction process; the definition of black changes for each image quality mode (the text mode, the text and photograph mode, the photograph mode, and the color/monochrome); or the amount of information is decreased by compressing the middle γ characteristics from highlight. As the amount of color deviation increases, a thin color line and a color deviation may be not identifiable from each other, or the definition of black of the gray balance becomes not unique, and thus the definition of the determination of a chromatic color or an achromatic color changes for each definition of a stored image, which causes erroneous determination of the color/monochrome in the ACS. In other words, in general technology, at the time of reading out image data, image processing such as a filtering process and a color conversion process is performed on the read image only for the device such as the scanner, an attribute determination is performed on the image data after the image processing such as the color conversion, and the image data is stored in an HDD or the like. Therefore, there is a problem in that the accuracy of the attribute determination is low.

In addition, when an image is formed by reusing the image data that is determined to be a color image and is stored in the HDD, in a case where an image is formed by eliminating part of the image data such as the case of range designation, enlargement, masking, printing onto a paper sheet having a small size, or the like, although the image forming range is monochrome only, the image data is determined to be color as a whole. Accordingly, a billing process is performed as color data, which is disadvantageous to a user in cost.

SUMMARY OF THE INVENTION

It is an object of the present invention to at least partially solve the problems in the conventional technology.

According to an aspect of the present invention, there is provided an image processing apparatus including: a memory unit; a read-out image processing unit that performs read-out image processing on input image data and stores the image data on which the image processing has been performed in the memory unit; an output attribute determining unit that performs determination image processing on the image data stored in the memory unit and determines an attribute of the image data on which the determination image processing has been performed; an output image processing unit that performs output image processing on the image data according to the determined attribute; and an output unit that outputs the image data on which the output image processing has been performed by the output image processing unit.

According to another aspect of the present invention, there is provided a method of processing an image that is executed by an image processing apparatus including a memory unit, the method including: performing read-out image processing on input image data; storing the image data on which the image processing has been performed in the memory unit; performing determination image processing on the image data that is stored in the memory unit; determining an attribute of the image data on which the determination image processing has been performed; performing output image processing on the image data in accordance with the determined attribute; and outputting the image data on which the output image processing has been performed at the output image processing.

According to still another aspect of the present invention, there is provided a computer program product comprising a computer-usable medium having computer-readable program codes embodied in the medium for processing information in an image processing apparatus including a memory unit, the program codes when executed causing a computer to execute: performing read-out image processing on input image data; storing the image data on which the image processing has been performed in the memory unit; performing determination image processing on the image data that is stored in the memory unit; determining an attribute of the image data on which the determination image processing has been performed; performing output image processing on the image data in accordance with the determined attribute; and outputting the image data on which the output image processing has been performed at the output image processing.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a flowchart showing the sequence of the image processing according to the first embodiment;

FIG. 4 is a plan view showing the distribution of the target pixel X and peripheral pixels Y and X−1 that are referred to in counting the pixels when the output attribute determining section determines color/monochrome based on the distributions of color pixels and monochrome pixels;

FIG. 5A is a plan view showing the distribution of pixels (to which O is assigned) determined to be color by the output attribute determining section; and FIG. 5B is a plan view showing the values represented by the color determination data that are calculated for the pixels determined to be color;

FIG. 11 is a plan view showing the distribution of image data (for each pixel) representing an output image shown in FIGS. 10A and 10B;

FIG. 12 is a plan view showing an example of the filter coefficients of the smoothing filer process that are used by a filter part 15a;

FIG. 13 is a plan view showing the distribution of image data (for each pixel) as a result of performing a filtering process for the image data shown in FIG. 11 using the filter coefficients shown in FIG. 12;

FIG. 14 is a plan view showing an example of filter coefficients in a case where an enhancement filter process is performed by the color/monochrome determination filter part for the image data after the smoothing filter process shown in FIG. 13;

FIG. 15 is a plan view showing the distribution of image data (for each pixel) after the filtering process when an enhancement filtering process is performed by a color/monochrome determination filter part 17a using the filter coefficients shown in FIG. 14 for the image data after the smoothing filter process shown in FIG. 13;

FIG. 19 is a flowchart showing the sequence of image processing according to the second embodiment.

DETAILED DESCRIPTION OF THE PREFERRED EMBODIMENTS

Hereinafter, an image processing apparatus, an image processing method, and a computer program product according to exemplary embodiments of the invention will be described in detail with reference to the accompanying drawings.

First Embodiment

Figure 1:
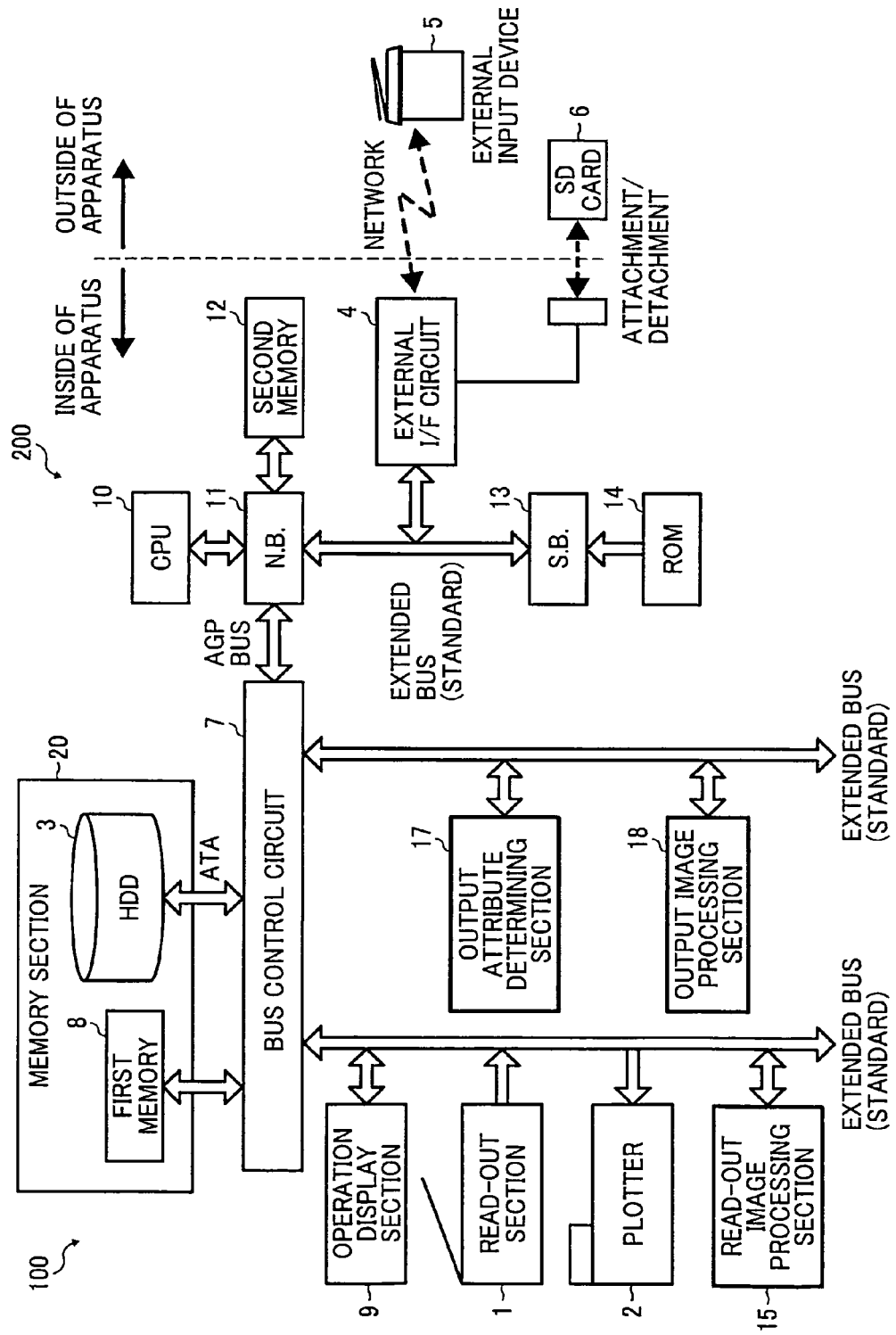
FIG. 1 is a schematic configuration diagram of a multi-function printer (MFP) according to a first embodiment.

FIG. 1 is a schematic configuration diagram of a multifunction printer (hereinafter, referred to as an "MFP") according to a first embodiment. As shown in FIG. 1, the MFP according to this embodiment has a configuration in which an image input/output engine unit 100 and a system control unit 200 are interconnected through an Accelerated Graphics Port (AGP) bus.

The image input/output engine unit 100 includes: a bus control circuit 7; a memory section 20 that includes a first memory 8 and an HDD 3 connected to the bus control circuit 7 through ATA interfaces; an operation display section 9, a read-out section 1, a plotter 2, and a read-out image processing section 15 that are connected to the bus control circuit 7 through an expanded bus; and an output attribute determining section 17 and an output image processing section 18 that are connected to the bus control circuit 7 through an expanded bus other than the above-described expanded bus.

The bus control circuit 7 is a control circuit of a data bus that exchanges various types of data such as image data and a control command that are necessary in the MFP, and also has a function of bridging between plural types of bus specifications.

The read-out section 1 includes a line sensor that is configured by a CCD photoelectric conversion element, an A/D converter, and driving circuits thereof. The read-out section 1 generates digital image data of RGB each formed by 8 bits based on shading information of a document by scanning the set document, and outputs the digital image data. The operation display section 9 includes a liquid crystal display part and an operation part (both of them are not shown in the figure). The liquid crystal display part displays various types of information for a user and receives an operation that is input through a touch operation or the like on the basis of the displayed information. The operation part, for example, is configured by operational buttons and receives various operations from a user. The memory section 20 includes a first memory 8 and an HDD 3. The read-out image processing section 15 performs read-out image processing for the image data read out by the read-out section 1 and stores the processed image data in the memory section 20.

The output attribute determining section 17 determines the attribute of the image data when the image data stored in the memory section 20 is output. The output image processing section 18 performs output image processing for the image data in accordance with the attribute that is determined by the output attribute determining section 17 and outputs the processed image data to a plotter 2. The plotter 2 outputs the image data to an output sheet.

Here, the read-out image processing section 15, the output attribute determining section 17, and the output image processing section 18 will be described later in detail.

The system control unit 200 shown to the right side of the AGP bus in FIG. 1 includes: a north bridge (hereinafter, referred to as an "N.B.") 11; a CPU 10; a second memory 12; a south bridge (hereinafter, referred to as an "S.B.") 13; a ROM 14; and an external I/F circuit 4. As shown in FIG. 1, the CPU 10, the second memory 12, and the S.B. 13 are connected to the N.B. 11. In addition, the ROM 14 is connected to the S.B. 13, and the S.B. 13 and the N.B. 11 are interconnected through the expanded bus. Furthermore, the external I/F circuit 4 is connected to the expanded bus.

The external I/F circuit 4 detects an SD card 6 that can be detachably attached, and is connected to an external input device 5 through a network such as the Internet.

The CPU 10 can transmit or receive text and image information to or from a Personal Computer (PC) connected to a LAN through the external I/F circuit 4 or a PC connected through the Internet and the external input device 5 having a communication function. In addition, the CPU 10 can communicate with an external printer, a digital camera, or the like using the external I/F circuit 4.

The CPU 10 performs overall control of the MFP. The N.B. 11 is a bridge that is used for connecting the CPU 10, the second memory 12, the S.B. 13, and the bus control circuit 7 each other. The second memory 12, which is a system memory, is a memory used as a drawing memory of the MFP or the like. The S.B. 13 is a bridge that is used for connecting the N.B. 11 to a PCI bus and a peripheral device.

Figure 2:
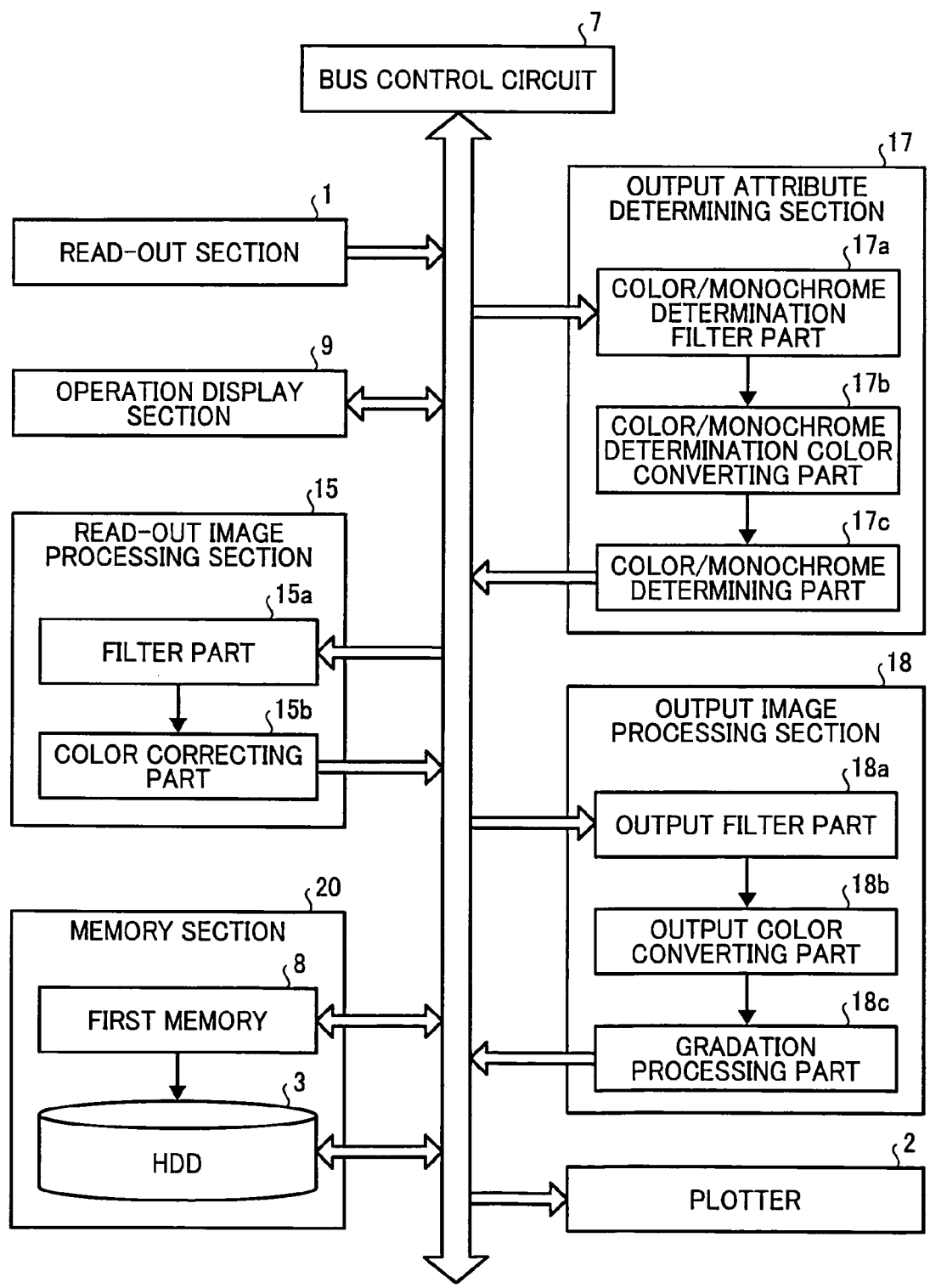
FIG. 2 is a block diagram showing the functional configuration of the MFP according to the first embodiment with focusing on image data processing.

FIG. 2 is a block diagram showing the functional configuration of the MFP according to the first embodiment with focusing on image data processing. In FIG. 2, shown are only the read-out section 1, the read-out image processing section 15, the memory section 20, the output attribute determining section 17, the output image processing section 18, the plotter 2, the bus control circuit 7, and the operation display section 9.

The read-out image processing section 15, as shown in FIG. 2, includes a filter part 15a and a color correcting part 15b. The read-out image processing section 15 performs MTF correction, moiré correction, sharpness improvement, and a color correction process for the image data read out by the read-out section 1. More specifically, the filter part 15a improves sharpness by performing a filtering process on the read-out image data. The color correcting part 15b performs on the read-out image data the MTF correction, the moiré correction, and conversion into a predetermined color space such as a uniform color space (sRGB). The image data on which the read-out image processing has been performed as above is stored in the first memory 8 by the read-out image processing section 15. Alternatively, the read-out image processing section 15 can be configured to store the image data in the HDD 3.

In this embodiment, the operation display section 9 receives an instruction from a user for outputting the image data stored in the first memory 8. When directing an output operation, the user may designate a partial output which indicates an output of image data by removing a part of the image data stored in the first memory 8. In such a case, the operation display section 9 receives designation of a partial output. As such designation of partial output, there are designation of an output range of image data, enlargement designation, designation of masking a part of image data, designation of a sheet smaller than the read-out document, and the like.

When there is an instruction for output and there is designation of partial output from a user at the time of the instruction for output, the output attribute determining section 17 reads out image data that is directed from the first memory 8, performs image processing for determination for the range of the read-out image data that is designated by the partial output designation, and determines the attribute of the image data on which the image processing for determination has been performed. Here, as the attributes of the image data, there are a text document, a photograph document, a text and photograph document, a white-sheet document, a color/monochrome document, and the like. In this embodiment, the output attribute determining section 17 is described to determine color/monochrome as the attribute of the image data.

In addition, the output attribute determining section 17, as shown in FIG. 2, includes a color/monochrome determination filter part 17a, a color/monochrome determination color converting part 17b, and a color/monochrome determining part 17c.

The color/monochrome determination filter part 17a performs a filtering process for the image data in the range designated by the partial output designation out of the image data stored in the first memory 8 as determination image processing. The color/monochrome determination color converting part 17b performs a process of converting image data into the image data of a color space before the conversion process performed by the color correcting part 15b of the read-out image processing section 15 as the determination image processing. In other words, image data is inversely converted into the image data before the read-out image processing performed by the read-out image processing section 15 through the determination image processing that is performed by the color/monochrome determination filter part 17a and the color/monochrome determination color converting part 17b.

The color/monochrome determining part 17c performs attribute determination for the inversely converted image data as above, that is, for the image data before the read-out image processing so as to determine whether it is color or monochrome.

The output image processing section 18 receives an instruction for output and performs output image processing for the image data that is stored in the first memory 8 in accordance with the determined attribute. The output image processing section 18 includes an output filter part 18a, an output color converting part 18b, and a gradation processing part 18c.

The output filter part 18a performs a filtering process for the image data as the output image processing. The output color converting part 18b converts the image data into image data of a color space for printing that is appropriate for the plotter 2, which is an output device, as the output image processing. The gradation processing part 18c performs a gradation process for the image data as the output image processing in a case where the image data corresponds to a monochrome image.

In this embodiment, both the attribute determining process performed by the output attribute determining section 17 and the output image processing performed by the output image processing section 18 are performed in parallel. Accordingly, in this embodiment, the output image processing section 18 performs both the color image processing and the monochrome image processing for the image data stored in the first memory 8 regardless whether the attribute of the image data stored in the first memory 8 is color or monochrome, and stores the image data (two types of image data) after each image processing in the first memory 8. In other words, a plurality of types of image data, for which the image processing according to different attributes has been performed, is generated.

When the attribute determination performed by the output attribute determining section 17 is completed, the output image processing section 18 acquires the determined attribute from the color/monochrome determining part 17c of the output attribute determining section 17, selects the image data corresponding to the determined attribute out of the two types of image data generated in the first memory 8, and deletes the image data corresponding to an attribute other than the determined attribute from the first memory 8. For example, when the attribute of the image data is determined to be color by the color/monochrome determining part 17c of the output attribute determining section 17, the image data, for which the color image processing has been performed, is selected out of the two types of image data stored in the first memory 8, and the image data, for which the gradation process has been performed by the gradation processing part 18c, is deleted from the first memory 8. Then, the output image processing section 18 outputs the selected image data to the plotter 2, and the selected image data is printed by the plotter 2.

Next, the image processing according to this embodiment configured as above will be described. FIG. 3 is a flowchart showing the sequence of the image processing according to the first embodiment.

First, an image of a document is read out by the read-out section 1'(Step S11), and the read-out image data is stored in the first memory 8. Then, the filter part 15a of the read-out image processing section 15 performs a filtering process for the image data stored in the first memory 8 (Step S12), and the color correcting part 15b of the read-out image processing section 15 performs a color correction process such as a color conversion process for the image data (Step S13). Then, the read-out image processing section 15 stores the image data on which the above-described read-out image processing has been performed in the first memory 8 of the memory section 20 (Step S14).

When receiving an instruction for outputting the image data from a user, the output attribute determining section 17 determines whether partial output designation such as output range designation is made by the user together with the instruction for output (Step S15). When the partial output designation is not made (No in Step S15), the output image processing section 18 reads out only the image data directed to be output from the image data stored in the first memory 8, and the output image processing (Step S21, S22, and S23) is performed for the read-out image data by the output image processing section 18. In other words, the filtering process is performed for the image data by the output filter part 18a (Step S21), the color conversion process is performed by the output color converting part 18b (Step S22), and a gradation process is performed by the gradation processing part 18c (Step S23).

Then, the image data for which the above-described output image processing has been performed is output to the plotter 2, and the image data is output by the plotter 2 (Step S46).

Back to Step S15, when partial output designation is made by the user (Yes in Step S15), both the output image processing (Steps S31 to S33) performed by the output image processing section 18 and the attribute determining process (Steps S41 to S43) performed by the output attribute determining section 17 are performed in parallel. In other words, in the output image processing section 18, the image data directed to be output out of the image data stored in the first memory 8 is read out, a filtering process is performed for the image data by the output filter part 18a (Step S31), a color conversion process is performed by the output color converting part 18b (Step S32), and a gradation process is further performed (Step S33). The output image processing for color and the output image processing for monochrome are both separately performed for the image data read out from the first memory 8, and the output image processing section 18 stores two types of image data generated by the output image processing for color and the output imaging process for color in the first memory 8.

On the other hand, in parallel with the output image processing performed by the output image processing section 18, in the output attribute determining section 17, a filtering process is performed for the image data directed to be output, which is read out from the first memory 8, by the color/monochrome determination filter part 17a (Step S41); and a color conversion process is performed by the color/monochrome determination color converting part 17b (Step S42), so that the image data is inversely converted into the image data before the read-out image processing. Then, the attribute of the image data after the inverse conversion is determined by the color/monochrome determining part 17c (Step S43).

The attribute as the result of the determination is output to the output image processing section 18.

Then, in the output image processing section 18, the attribute as the result of the determination is acquired from the output attribute determining section 17 and selects image data corresponding to the attribute based on whether the determined attribute is color or monochrome or the like from the first memory 8 (Step S45). Then, the plotter 2 outputs the selected image data (Step S46).

Next, the above-described image processing will be described in detail with a major MFP function exemplified. In the example described below, designation of the output range of the image data as the partial output designation will be described as an example.

Copy Operation

A user sets a document in the read-out section 1 and performs setting of a desired mode and the like and inputting of copy start by using the operation display section 9 that is an operation display board. The operation display section 9 converts information (an instruction) input by the user into MFP-internal control command data and issues (generates) the control command data. The CPU 10 is informed of the issued control command data through the PCI bus, the bus control circuit 7, and the AGP bus. The CPU 10 executes a program of a copy operation process in accordance with the control command data of the copy start instruction and sequentially performs setting and operations necessary for a copy operation.

The document is scanned by the read-out section 1, and digital image data of RGB each formed by 8 bits is stored in the first memory 8 through the PCI bus and the bus control circuit 7. The CPU 10 sets the process according to the user's desired mode into the read-out image processing section 15. The content of the process will be described later.

In the read-out image processing section 15, data of RGB each formed by 8 bits, which is stored in the first memory 8, is read out, a filtering process is performed by the filter part 15a, correction such as conversion into a predetermined color space such as a uniform color space (sRGB) is performed by the color correcting part 15b, and the RGB 8-bit data for which the image processing has been performed is stored again in the first memory 8.

In a case where the output setting is made so as not to change the output image range by the user using the operation display section 9, in other words, that is in a case where partial output designation is not made by the user, the processed data of RGB, each formed by 8 bits that is stored in the first memory 8, is output to the output image processing section 18.

When receiving the image data of RGB each formed from 8 bits, the output filter part 18a performs for the image data a sharpening process or a smoothing process in accordance with information of the user's desired mode. For example, in the text mode, a sharpening process is performed so as to form the text to be distinctively clear, and, in the photograph mode, a smoothing process is performed so as to smoothly represent the gradation thereof.

When receiving the image data of RGB each formed by 8 bits, the output color converting part 18b converts the image data of RGB into CMYK data each formed by 8 bits that is a color space of the plotter 2 for printing. At this time, the Chroma is also adjusted in accordance with the information of the user's desired mode. The gradation processing part 18c performs a gradation-number converting process according to the gradation processing capability of the plotter 2 for the image data of RGB each formed by 8 bits. In this embodiment, the gradation processing part 18c performs a gradation-number conversion process for the image data so as to be converted into data of CMYK each formed by 2 bits by using an error diffusion method that is one of pseudo halftone processes.

On the other hand, in a case where a partial output instruction is not made by the user using the operation display section 9, it may be configured that the image data of RGB each formed by 8 bits that is stored in the first memory 8 is output to the output image processing section 18, the attribute thereof is determined, the output image processing section 18 performs a color output process or a monochrome output process based on the result determined by the output attribute determining section 17, and the image data is stored again in the first memory 8.

In a case where the output image range is changed by the user using the operation display section 9, in other words, in a case where a partial output instruction is made by the user, the image data of RGB each formed by 8 bits that is stored in the first memory 8 is output to the output image processing section 18 and the output attribute determining section 17. At this time, the output image processing section 18 performs two types of image processing including color image processing and monochrome image processing, and the images after each processing are stored in the first memory 8.

On the other hand, the output attribute determining section 17 performs color/monochrome determination within the output range that is set by the operation display section 9 and stores the determination result in the first memory 8. The output image processing section 18 determines the validness of one of the data, for which the color image processing has been performed, and the data, for which the monochrome image processing has been performed, based on the determination result of color data and monochrome data that have been stored immediately before. Then, the output image processing section 18 selects the data that is determined valid after the process, and deletes the image data that is determined invalid from the first memory 8.

The image data of RGB each formed by 8 bits that is stored in the first memory 8 is transmitted to the plotter 2 through the PCI bus and the bus control circuit 7. The plotter 2 outputs the received image data of RGB that is each formed by two bits to a transfer sheet, whereby generating a copy of the document.

Scanner Operation

A user sets a document in the read-out section 1 and performs a setting of a desired mode and the like and an inputting of scanner transmission start by using the operation display section 9. The operation display section 9 converts information (an instruction) input from the user into MFP-internal control command data and issues the control command data. The CPU 10 is informed of the issued control command data through the PCI bus, the bus control circuit 7, and the AGP bus. The CPU 10 executes a program of a scanner transmission operation process in accordance with the control command data of scanner read-out start and sequentially performs setting and operations necessary for a scanner transmission operation. The operation process is sequentially written as below.

The document is scanned by the read-out section 1, and digital image data of RGB each formed by 8 bits is stored in the first memory 8 through the PCI bus and the bus control circuit 7. The CPU 10 sets the process according to the user's desired mode in the read-out image processing section 15. The content of the process will be described later. At this time, the image data of RGB each formed by 8 bits inside the first memory 8 may be stored in the HDD 3 in a case where the user desires to store the data therein (data storage).

The image data of RGB each formed by 8 bits that is stored in the first memory 8 is transmitted to the read-out image processing section 15. In the read-out image processing section 15, a filtering process and correction through conversion into a determined color space are performed for the image data, and the processed image data of RGB 8 bits is stored again in the first memory 8.

In a case where the output setting is made so as not to change the output image range by the user using the operation display section 9, in other words, in a case where a partial output instruction is not made by the user, the processed data of RGB each formed by 8 bits that is stored in the first memory 8 is transmitted to the output image processing section 18.

In the output image processing section 18, when receiving the image data of CMYK each formed from 8 bits, the output filter part 18a performs for the received image data a sharpening process or a smoothing process in accordance with information of the user's desired mode, whereby generating image data.

For example, the output image processing section 18 performs a sharpening process so as to form the text to be distinctively clear in the text mode and performs a smoothing process so as to smoothly represent the gradation in the photograph mode for the output image processing section 18. When receiving the image data of RGB each formed by 8 bits, the output color converting part 18b of the output image processing section 18 converts the image data of RGB into data of CMYK each formed by 8 bits that is a color space of the plotter 2 for printing. At this time, the Chroma is also adjusted in accordance with the information of the user's desired mode. In the gradation processing part 18c of the output image processing section 18, the process becomes through in the case of a color operation, and one between through and binarization is selected in accordance with the content set by the operation display section 9.

The image data of RGB, each formed by 8 bits that is stored in the first memory 8, is transmitted to the network through the bus control circuit 7, the AGP bus, the N.B. 11, the PCI bus, and the external I/F circuit 4 so as to be transferred to an external server or the external input device 5, whereby scanner transmission is performed.

Printer Operation

A user prints an electronic document through application software of the external input device 5. When using the application software, the user can add illegal copy preventing function and can arbitrarily set the area thereof. The printer driver software of the external input device 5 performs rendering of the electronic document designated to be printed so as to generate digital image data of CMYK each formed by two bits.

The external input device 5 transmits a print request and the generated digital image data of CMYK each formed by two bits to the MFP, which is a digital image processing apparatus, through a network. When receiving control command data of the print request from the external input device 5 through the external I/F circuit 4, the PCI bus, and the N.B. 11, the CPU 10 sequentially performs necessary settings and operations by executing a program of a printer operation process. Hereinafter, the operation process will be sequentially described.

The digital image data of each of CMYK, each formed by two bits, that is transmitted from the external input device 5 through the network is stored in the first memory 8 through the external I/F circuit 4, the PCI bus, the N.B. 11, and the bus control circuit 7. The image data of CMYK each formed by two bits that is stored in the first memory 8 is transmitted to the plotter 2 through the PCI bus and the bus control circuit 7. The plotter 2 prints out the image data by outputting the received image data of CMYK each formed by two bits onto a transfer sheet.

Currently, there are many types of MFPs having many various functions and uses. Thus, a case where a stored image is reused so as to be output can be considered. However, there is a need for forming an image having high reusability by increasing reusability and storing the image in a uniform space without decreasing the productivity. In reusing the image, the image needs to be transmitted to a plurality of types of output destinations for copy, transfer, facsimile, and the like. For copy, the image needs to be converted into data using toner of Cyan (C), Magenta (M), Yellow (Y), Black (K), and the like. In addition, for transfer or facsimile, the image needs to be converted into RGB data, gray scales, or a binary image in accordance with a transmission sheet, and the resolution also needs to be converted. Accordingly, in this embodiment, at the time of storing an image, the image is converted into data of a uniform color space, which can be reused, by the read-out image processing section 15 and is stored in the first memory 8 or the HDD 3; and after the storage, image processing according to the output destination is performed by the output image processing section 18.

Next, the method of determining the attribute according to this embodiment will be described in detail. This attribute determination is performed by the output attribute determining section 17. The output attribute determining section 17 determines the attribute of generated image data based on the image data.

In this embodiment, used is a method in which the output attribute determining section 17 determines a text document, a text and photograph document, and a photograph document by using edge determination, halftone dot determination, and gray determination described in Japanese Patent No. 3983101. In other words, for the range (the number of pixels) of a document, a document is determined to be a text document, a text and photograph document, or a photograph document depending on the degree of numbers of pixels acquired in the edge determination, the halftone-dot determination, and the gray determination. When the number of the pixels determined to be edges (edge determination) is great, the region is determined to be a text region (text document). On the other hand, when the number of pixels determined to be halftone dots (halftone-dot determination) and determined to be gray (gray determination) is great, the region is determined to be a photograph region (a photograph document). In addition, when the determined numbers of pixels are equally included, the region is determined to be a text and photograph region (a text and photograph document). In addition, for the color/monochrome determination, a method described in Japanese Patent No. 3983101 is used. The color/monochrome determination is performed in units of one pixel, and whether color information is included in an image is determined by counting the number of continuous pixels determined to be color or monochrome based on the result of determination of color or monochrome in units or one pixel.

Next, the counting method used by the output attribute determining section 17 will be described with reference to FIG. 4. "X" in FIG. 4 denotes a target pixel or the color determination data (gradation data representing coloring: multi-bit data) of the target pixel. In addition, "Y" denotes a pixel that is positioned before "X" by one line or the color determination data of the pixel, and "X−1" denotes a pixel positioned before the target pixel by one pixel in the main scanning direction or the color determination data of the pixel. In the color determination data X of the target pixel X, a value acquired by adding a maximum value of "X−1" and "Y" and the value of "z" is substituted for the X. Here, "z" is a correction value that is determined based on whether the target pixel X is an edge portion or an edge middle portion. It can be represented in the following equation.

$$X = \mathrm{MAX}(Y, X-1) + z$$

FIGS. 5A and 5B represent an example. FIG. 5A shows a color pixel distribution in which "o" is assigned to pixels that are determined to be "color" through color/monochrome determination; and FIG. 5B shows values represented by the color determination data that are calculated for pixels determined to be "color". In this example, a maximum value of the color determination data is "25." As the value of the color determination data increases, it represents that there is color information that is more continuous. When there is data determined to be color within a specific area, and the number of pixels having values equal to or greater than a threshold value is equal to or larger than a predetermined value, the document is determined to be a color document.

As above, the attribute determination (the color/monochrome determination) can be performed for a document. Such an algorithm assumes that the determination is performed for an image space in which the read-out reflectivity read out by the read-out section 1 is linear as a standard. However, generally, a case is not considered where a determination is performed after image processing. However, the method of using a copier is diversified including a case where image data is used or image data is changed in the middle of a process or the like. Thus, in a case where a processed image is stored once, and the stored image is processed again so as to be output next time, image processing is performed first in accordance with the output, and then, the processed image is stored. By performing a filtering process, a color correction process, and the like using the read-out image processing section 15, the image is processed as below.

Filtering Process

In order to improve the resolving power of a text and eliminate moiré, image processing is performed by an enhancement filter and a smoothing filter.

Color Correction Process

The read-out image processing section 15 converts a read-out color space into an output color space. When the read-out color space is directly output, an image having color taste different from that of the document is output, and accordingly, the color correcting part 15b converts the color taste. In addition, the read-out color space is a space in which the reflectively is linear, and accordingly, the read-out section 1 converts data into the color space of an output destination. For example, in a copy application (copy function), conversion into a space in which the density is linear is performed, and, in an image delivery application (image delivery function), conversion into a binary image is performed.

However, the read-out image processing section 15 performs the conversion process for output. Thus, there is a problem in that, for example, color deviation due to vibration of the scanner increases by performing an enhancement process or a smoothing process using a filter; the definition of gray balance becomes a definition according to the output destination by performing a color correction process; the definition of black changes for each image quality mode; or the amount of information is decreased by compressing the Middle γ characteristics from highlight. As the amount of color deviation increases, a thin color line and color deviation become not identifiable from each other, or the definition of black of the gray balance becomes not unique, and thus the definition of the determination of a chromatic color or an achromatic color changes for each definition of a stored image.

As an image is processed as above by the read-out image processing section 15, an erroneous determination may happen in the attribute determination process. Accordingly, in order to perform a determination well, in this embodiment, performed is an inverse conversion process for returning data to the information read out by the read-out section 1 by using the output attribute determining section 17, the color/monochrome determination filter part 17a, and the color/monochrome determination color converting part 17b. In this embodiment, the output attribute determining section 17 performs a process of returning the processed color space into the original space. As the process of returning to the original, correction is performed through γ correction by the color/monochrome determination color converting part 17b. The space conversion through the γ correction will be described.

In the γ conversion, one-to-one data conversion is performed for input data. For example, when the γ conversion is performed for RGB data each formed by 8 bits, a table of 256 gradations is prepared for each of RGB, and one-to-one conversion is performed for the input. In addition, correction using a three-dimensional LUT is also performed. The brief overview of the three-dimensional LUT performed by the color/monochrome determination color converting part 17b is as follows.

The color/monochrome determination color converting part 17b performs color conversion through the three-dimensional LUT. As a conversion algorithm, a memory map interpolating method is used, which is generally widely used. In addition, the color/monochrome determination color converting part 17b also has a function for normalizing the memory map interpolated output, and has a function for outputting a minimum value of CMY as K. The three-dimensional LUT has two types for a drawing region and a text region, and switching therebetween can be performed in accordance with a separation signal.

Figure 6A:
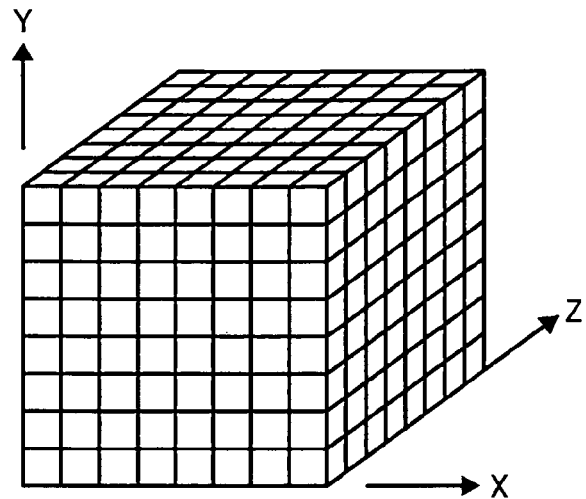
FIG. 6A is a cubic diagram representing 8 divisions (lattice points) of an interpolated interval for interpolation calculation in γ conversion using a three-dimensional LUT in the color/monochrome determination color converting section shown in FIG. 2.

The three-dimensional memory map interpolation shown in FIGS. 7A to 7F is performed for the input image data of 8 bits (In_R, In_G, and In_B). In the memory map interpolating method, a three-dimensional input color space is divided into a plurality of unit cubes, each unit cube that has been divided is further divided into six tetragons sharing symmetrical axes, and an output value is acquired through a linear operation for each unit cube. In the linear calculation, data of points (lattice points) on the division boundary are used as parameters (hereinafter, referred to as lattice point parameters). The actual processing sequence is as follows (the same process is performed for each output block). In addition, in this three-dimensional memory map interpolation, as shown in FIG. 6A, division into eight is performed.

Figure 6B:
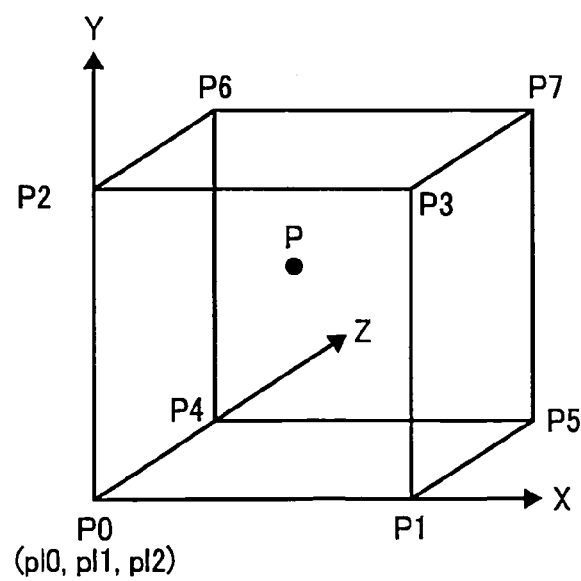
FIG. 6B is a cubic diagram showing the distribution of output values (converted values) P0 to P7 of the lattice points.
Figure 7A:
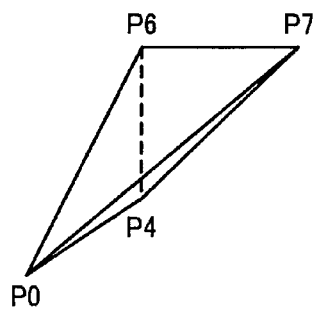
FIGS. 7A to 7F are cubic diagrams showing the distribution of output values of four apexes of a tetragonal used in interpolation calculation.
Figure 7B:
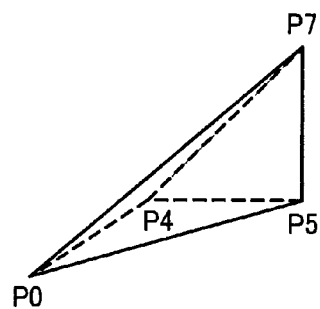
Figure 7C:
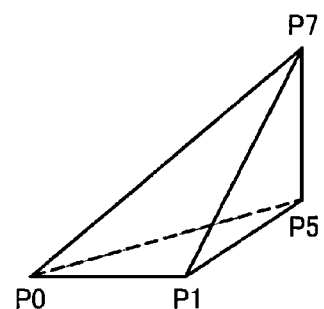
Figure 7D:
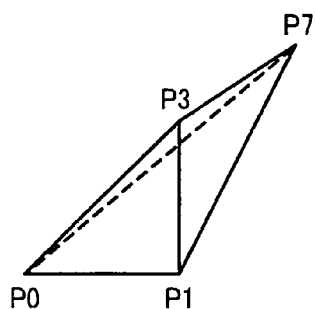
Figure 7E:
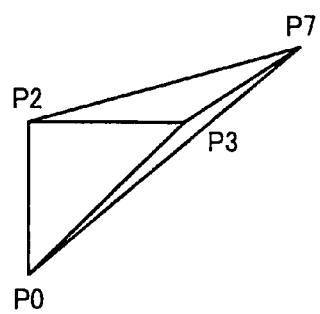
Figure 7F:
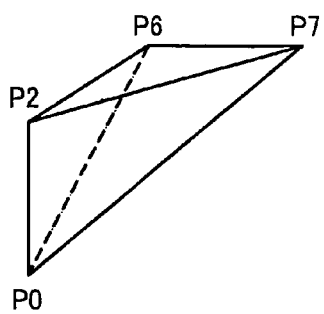

When the input data is assumed to be X(x, y, z), first, a unit cube including the coordinates X is selected. Here, X(x, y, z)=(In_R, In_G, In_B). Then, sub-coordinates (Δx, ΔY, Δz) of the coordinates P inside the selected unit cube are acquired; a unit tetragon is selected by comparing the magnitudes of the sub-coordinates; and linear interpolation is performed for each unit tetragon, whereby an output value Pout at the coordinates P is acquired. Pout is acquired by multiplying the entire equation by the length of one side of the unit tetragon so as to be an integer value. FIG. 6B represents lattice point output values of P0 to P7. Here, interpolation coefficients K0, K1, K2, and K3 are determined in accordance with the magnitude relations of Δx, Δy, and Δz and the above-described separation signal.

TABLE 1

| Discriminant | Tetragonal | Coefficient K0 | Coefficient K1 | Coefficient K2 | Coefficient K3 |
|---|---|---|---|---|---|
| Δx < Δy < Δz | T0 | P7-P6 | P6-P4 | P4-P0 | P0 |
| Δx ≤ Δy < Δz | T1 | P5-P4 | P7-P5 | P4-P0 | P0 |
| Δx < Δy ≤ Δz | T2 | P1-P0 | P7-P5 | P5-P1 | P0 |
| Δx ≤ Δy ≤ Δz | T3 | P1-P0 | P3-P1 | P7-P3 | P0 |
| Δx ≤ Δy < Δz | T4 | P3-P2 | P2-P0 | P7-P3 | P0 |
| Δx < Δy ≤ Δz | T5 | P7-P6 | P2-P0 | P6-P2 | P0 |

FIGS. 7A to 7F show tetragons that are configured by lattice points that are used for interpolation for forming an interpolation tetragon. Table 1 shows a determination rule of common interpolation coefficients according to each separation signal. Finally, linear interpolation is performed by using the following equation based on the output values on apexes of four points of the selected tetragonal that are set in advance and the input position (a distance from each apex) inside the tetragon.

$$pout\_R = K0\_R \times \Delta x + K1\_R \times \Delta y + K2\_R \times \Delta z + K3\_R << 5$$

$$pout\_G = K0\_G \times \Delta x + K1\_G \times \Delta y + K2\_G \times \Delta z + K3\_G << 5$$

$$pout\_B = K0\_B \times \Delta x + K1\_B \times \Delta y + K2\_B \times \Delta z + K3\_B << 5$$

Figures 8, 9:
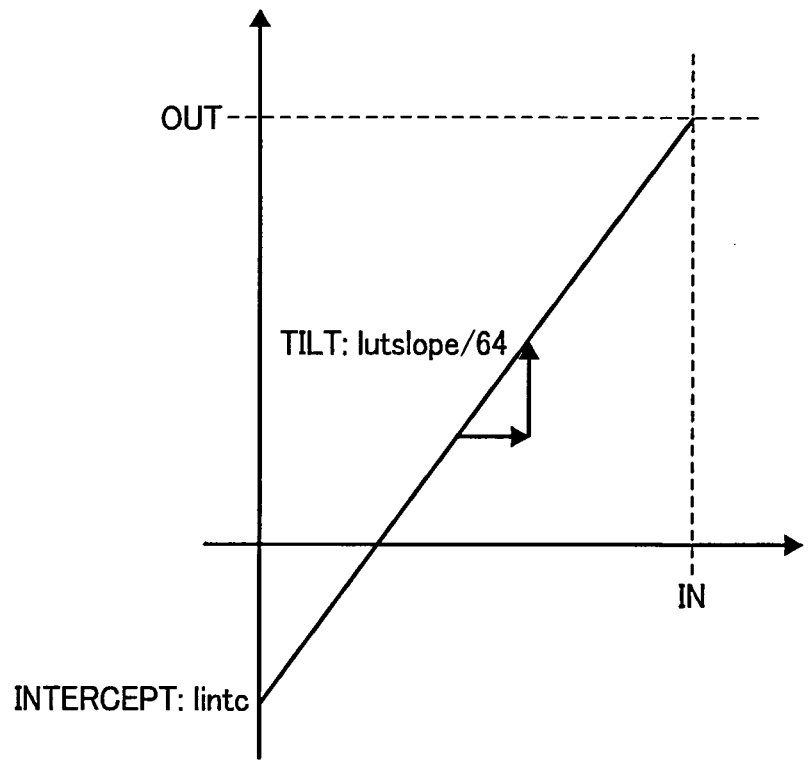
FIG. 8 is a graph showing the relation between the input and the output in the linear normalization with respect to the output of the γ conversion using a three-dimensional LUT.
FIG. 9 is a plan view showing the distribution of codes representing filter coefficients assigned to each pixel of the pixel matrix that is used by the color/monochrome determination filter part shown in FIG. 2.

Linear normalization is performed for the calculated output of the three-dimensional LUT by using the following equation using the tilt and the intercept (see FIG. 8). In addition, when the data after normalization is negative, the value is clipped to zero.

$$hokan\_R = (pout\_R * lutslope) >> 12?lintc$$

$$hokan\_G = (pout\_G * lutslope) >> 12?lintc$$

$$hokan\_B = (pout\_B * lutslope) >> 12?lintc$$

In addition, the extended range can be changed for each output plane of the three-dimensional LUT conversion. In such a case, as represented below, the tilt and the intercept are set for each output plane. Accordingly, even in a case where the shapes of an extended RGB space in which the color reproduction range is broad and the color reproduction range (gamut) of a color image output device are greatly different from each other, conversion into the colors of the color image output device with high precision can be performed without increasing the scale of the color conversion table.

$$hokan\_R = (pout\_R * lutslope\_R) >> 12?lintc\_R$$

$$hokan\_G = (pout\_G * lutslope\_G) >> 12?lintc\_G$$

$$hokan\_B = (pout\_B * lutslope\_B) >> 12?lintc\_B$$

Next, the process performed by the color/monochrome determination filter part 17a will be described. As the filter, an m×n filter is used. Here, the description will be presented using a 5×5 filter. When the 5×5 filter is used, a matrix as shown in FIG. 9 is formed. Here, a1, a2, a3, b1, b2, b3, c1, c2, and M are filter coefficients for each pixel. There are two types of filters on the basis of the property of the image quality, and the filters are classified into a smoothing filter that dulls an image and an enhancement filter that enhances an image. First, the use of the smoothing filter will be described.

As described above; an image is processed by performing a filtering process using the read-out image processing section 15. When the attribute determination is performed in this state, an erroneous determination is made. Thus, in order to prevent such an erroneous determination on the image processing performed by the filter part 15a, the color/monochrome determination filter part 17a is used for the purpose of reprocessing. The process of the color/monochrome determination filter part 17a will be described using the 5×5 filter shown in FIG. 9. The filtering process is performed with M used as the target pixel. The smoothing filter acquires values through calculation as below using the matrix shown in FIG. 9.

$$(a1 \times X11 + a2 \times X12 + a3 \times X13 + a2 \times X14 + a1 \times X15) +$$
$$(b1 \times X21 + b2 \times X22 + b3 \times X23 + b2 \times X24 + b1 \times X25) +$$
$$(c1 \times X31 + c2 \times X32 + M \times X33 + c2 \times X34 + c1 \times X35) +$$
$$(b1 \times X41 + b2 \times X42 + b3 \times X43 + b2 \times X44 + b1 \times X45) +$$
$$(a1 \times X51 + a2 \times X52 + a3 \times X53 + a2 \times X54 + a1 \times X55)$$

Here, the value of M is acquired by subtracting a sum of the filter coefficients other than M from one. For the matrix shown in FIG. 9, calculation is performed as below.

$$M=1-(4\times(a1+b1)+2\times(a3+b3+c1+c2))$$

By using the above-described equations, the smoothing filter can function.

Next, the enhancement filter will be described. Similarly, the enhancement filter will be described using the 5×5 filter shown in FIG. 9. Although the enhancement filter performs a filtering process with M used as the target pixel, which is similar to the smoothing filter, it performs calculation as below using the matrix shown in FIG. 9.

$$X33 + ((a1 \times X11 + a2 \times X12 + a3 \times X13 + a2 \times X14 + a1 \times X15) +$$
$$(b1 \times X21 + b2 \times X22 + b3 \times X23 + b2 \times X24 + b1 \times X25) +$$
$$(c1 \times X31 + c2 \times X32 + M \times X33 + c2 \times X34 + c1 \times X35) +$$
$$(b1 \times X41 + b2 \times X42 + b3 \times X43 + b2 \times X44 + b1 \times X45) +$$
$$(a1 \times X51 + a2 \times X52 + a3 \times X53 + a2 \times X54 + a1 \times X55))$$

However, in the case of the enhancement filter, the value of M is acquired such that a sum of M and the other filter coefficients is zero, and accordingly, the value of M is acquired by using an equation as below.

$$M=0-(4\times(a1+b1)+2\times(a3+b3+c1+c2))$$

By using the above-described equations, the enhancement filter can be formed. Hereinafter, the correction operation using such a filtering process will be described.

Figure 10A:
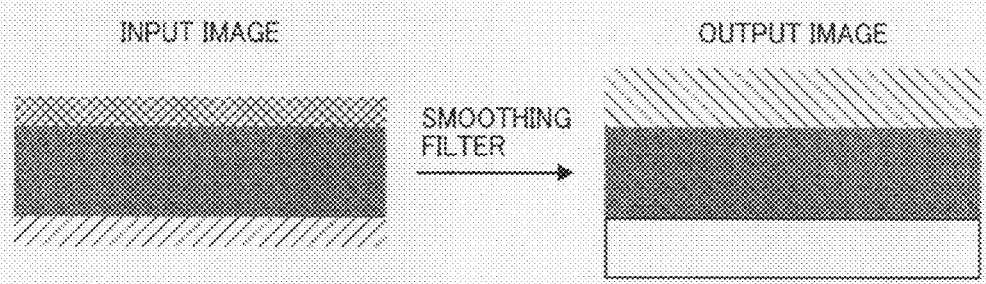
FIG. 10A is a plan view showing the relation between the input and output when a smoothing filter process is performed by the color/monochrome determination filter part.
Figure 10B:
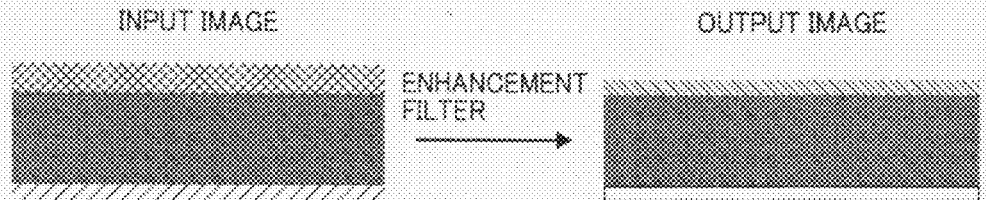
FIG. 10B is a plan view showing the relation between the input and the output at the time of performing an enhancement (sharpening) filter process.

The smoothing filter shown in FIG. 10A and the enhancement filter shown in FIG. 10B show color deviation occurring when an image is read out by the read-out section 1. A dark line positioned in the center represents a black line, and gray lines positioned to the upper and lower sides thereof represent colors that are generated due to color deviation. When the input image shown in FIGS. 10A and 10B is represented by digital data, data as shown in FIG. 11 is formed. When the smoothing filter as shown in FIG. 12 is built in the filtering process performed by the filter part 15a for the data shown in FIG. 11, the data shown in FIG. 10A is converted into data as shown in FIG. 13.

As can be understood from FIG. 13, first, although there is color deviation in one line, the color deviation spreads up to two lines through the smoothing filter. In the color/monochrome determination filter part 17a, by allowing this image to pass through the enhancement filter so as to be returned to the original image, the original data is recovered.

In the color/monochrome determination filter part 17a, by allowing the image data shown in FIG. 13 to pass though the enhancement filter shown in FIG. 14, the image data is converted as shown in FIG. 15. As can be understood from FIG. 15, by allowing the image, which has passed through the smoothing filter, to pass through the enhancement filter, the image data is formed to be close to the original data, and the color deviation of one line can be recovered. By performing the above-described conversion, the image data can be formed to be close to the read-out data read out by the image read-out section 1.

As described above, there is also a case (for example, output to the plotter 2 through a copy function) where, after image data is stored, as shown in FIG. 3, the output image processing is performed. The output image processing section 18 again performs a filtering process (the output filter part 18a), a color conversion process (the output color converting part 18b), a magnification changing process, a gradation process, and the like for the image data that is stored in the first memory 8 or the HDD 3.

Figure 16A:
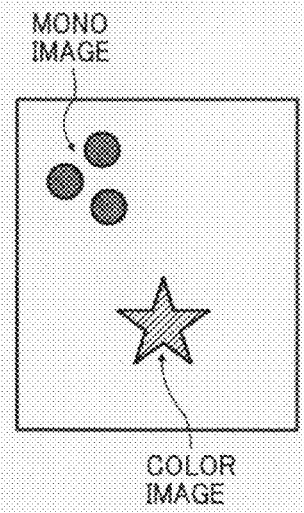
FIG. 16A is a plan view showing an image on a document that is read out or copied.
Figure 16B:
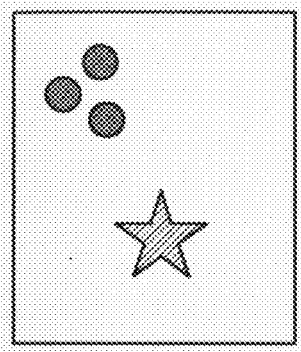
FIG. 16B is a copy thereof.
Figure 16C:
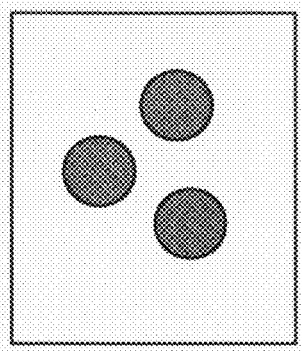
FIG. 16C is a copy of only a monochrome image in an enlarged scale.
Figure 16D:
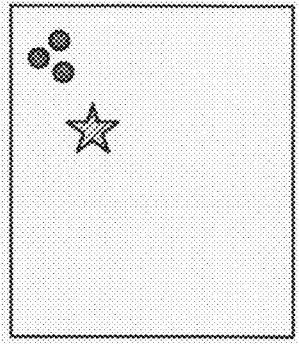
FIG. 16D is a copy of the document in a reduced scale.
Figure 16E:
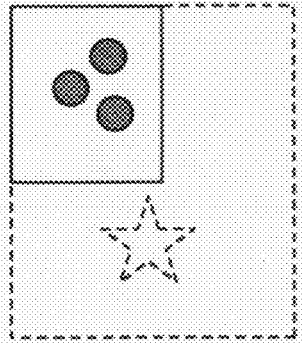
FIG. 16E is a copy at an equal magnification with the monochrome image cut out.

In addition, not only the output of the entire image that has been stored, but also output of a part of an image, output of an image in an enlarged scale, and the like may occur. For example, as shown in FIG. 16A, assuming that there is a document in which color data and monochrome data are included. In a case where the document is directly output as shown in FIG. 16B, a case where the document is output in an enlarged scale as shown in FIG. 16C, or a case where the document is output in a reduced scale as shown in FIG. 16D, the document is output with the color data thereof being included. Accordingly, the color determination can be performed well in the color/monochrome determination process. However, in a case where the document is output in an enlarged scale, as shown in FIG. 16C, a case where only a monochrome image is output can occur. In such a case, the color/monochrome determining part 17c needs to determine the document as monochrome. In addition, as shown in FIG. 16E, when a part of the document is output, in a case where only a monochrome image is selected, the document needs to be determined as monochrome in the color/monochrome determination process.

Since there is a case where a region to be output is changed after image data is stored as described above, it is preferable that the attribute determination is performed after storage of data as shown in FIG. 3. However, performing output image processing, after the attribute determination process, may cause a decrease in the productivity. Accordingly, as shown in FIG. 3, by performing the output attribute determination and the output image processing in parallel, the process can be performed without decreasing the productivity. After the output image processing, whether output of color data or monochrome data is to be performed is determined (selected) by combining the result of the color/monochrome determination acquired by the output attribute determining section 17, and then data is output to the plotter 2.

As described above, according to this embodiment, an attribute determination can be performed for an image that is represented by the image data with high precision, and accordingly, a correct attribute determination can be performed. In addition, even in a case where a part of the read-out image is output after storage of the image, an attribute determination for the output range after changed can be accurately performed, whereby the user convenience can be improved.

In addition, according to this embodiment, whether an image represented by the image data is color or monochrome can be determined with high precision.

In addition, according to this embodiment, after an image delicately deviated from an image (original image) that is generated by reading a document or photographing is substantially returned to the original image by the read-out image processing section 15, an attribute determination is performed. Accordingly, the attribute determination can be performed sufficiently based on the original image, and thereby the determination precision of the output attribute determining section 17 can be improved.

In addition, according to this embodiment, by performing a filtering process, the amount of deviation of a color that is enhanced by the read-out image processing section 15 can be reduced, whereby the accuracy of the attribute determination can be improved.

In addition, according to this embodiment, even when the output condition is changed after storage of data, an image corresponding to a condition can be provided by performing image processing again using the output image processing section 18. In addition, by performing parallel processes using the output attribute determining section 17, a processing time can be shortened, whereby a decrease in the productivity can be suppressed.

In addition, according to this embodiment, in a case where a color image and a monochrome image are mixed in an original image, when the output image range is changed by a user, and the output image range corresponds to only a color image or only a monochrome image, an attribute determination corresponding thereto is accurate, and the accuracy of the attribute determination for the output image is high.

In addition, according to this embodiment, by recording the above-described program on recording media and distributing the recording media, the cost, portability, generality or versatility for performing the above-described image processing method can be improved.

Second Embodiment

According to the first embodiment, by performing the color/monochrome determination using the output attribute determining section 17 in parallel with the output image processing, the output image processing section 18 needs to perform the process in a state in which whether the output is color output or monochrome output is not clear, which may cause deterioration of the image quality. In addition, a configuration, in which color processing and monochrome processing are performed in parallel in the output image processing section 18, can be considered. However, such a configuration is not practical due to an increase in the scale of hardware. When output is performed, which is not re-use of data, in a case where a configuration in which the result of the color/monochrome determination can be known through the attribute determination process before the output image processing is used, the output image processing section 18 can perform the process by determining which one of the color processing and the monochrome processing is preferable.

Thus, in the second embodiment, include is a read-out attribute determining section 16 that performs the color/monochrome determination in a similar way also for the image data, which is read out by the read-out section 1, before being stored.

Figure 17:
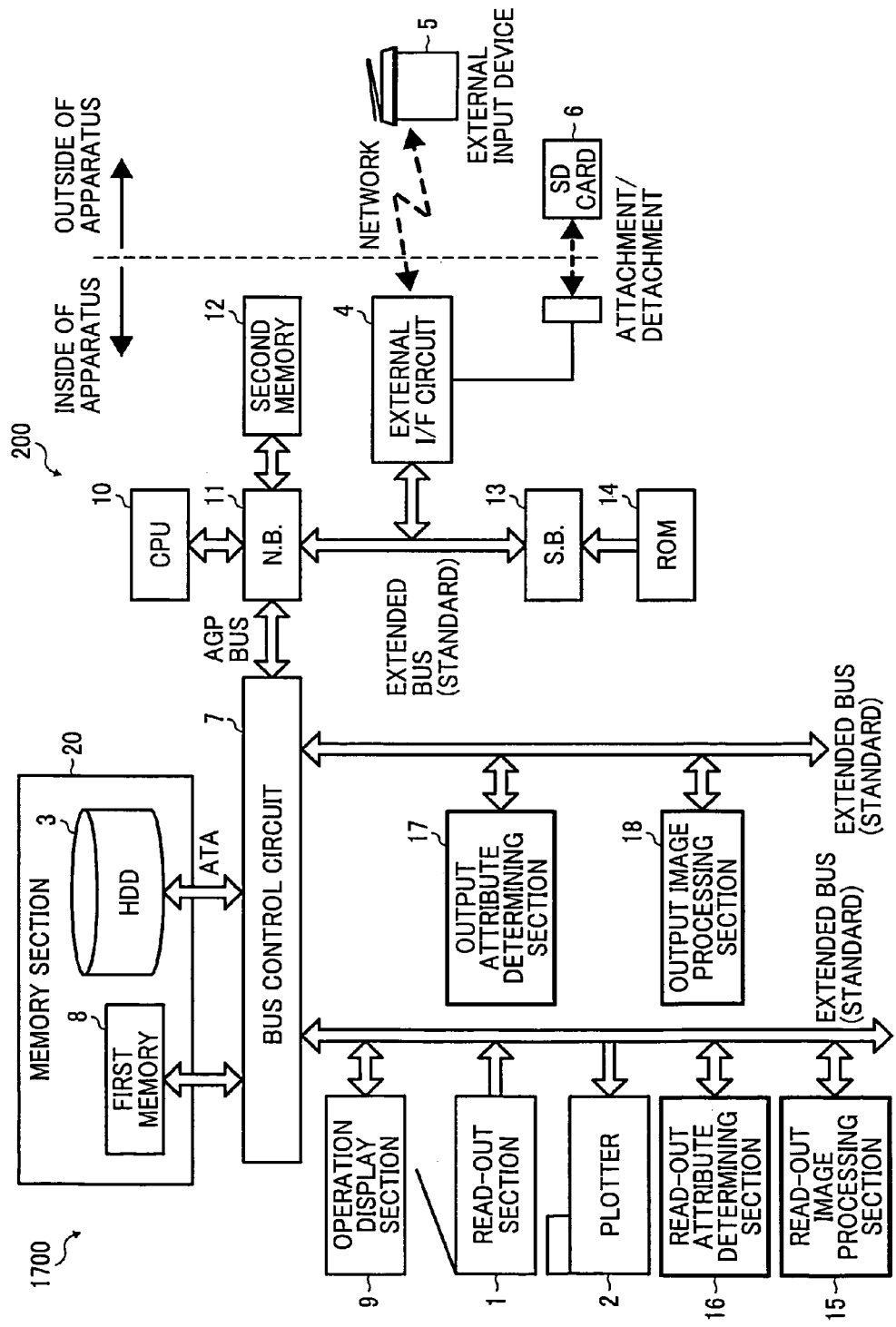
FIG. 17 is a schematic configuration diagram of an MFP according to a second embodiment.

FIG. 17 is a schematic configuration diagram of an MFP according to the second embodiment. As shown in FIG. 17, the MFP according to this embodiment has a configuration in which an image input/output engine unit 1700 and a system control unit 200 are interconnected through an AGP bus. Here, the configuration of the system control unit 200 is the same as that of the first embodiment.

The image input/output engine unit 1700 includes: a bus control circuit 7; a memory section 20 that is configured by a first memory 8 and an HDD 3 connected to the bus control circuit 7 through ATA interfaces; an operation display section 9, a read-out section 1, a plotter 2, a read-out image processing section 15, and the read-out attribute determining section 16 that are connected to the bus control circuit 7 through an expanded bus; and an output attribute determining section 17 and an output image processing section 18 that are connected to the bus control circuit 7 through an expanded bus other than the above-described expanded bus. Here, the configurations of the bus control circuit 7, the memory section 20, the operation display section 9, the read-out section 1, the plotter 2, the read-out image processing section 15, the output attribute determining section 17, and the output image processing section 18 are the same as those of the first embodiment.

Figure 18:
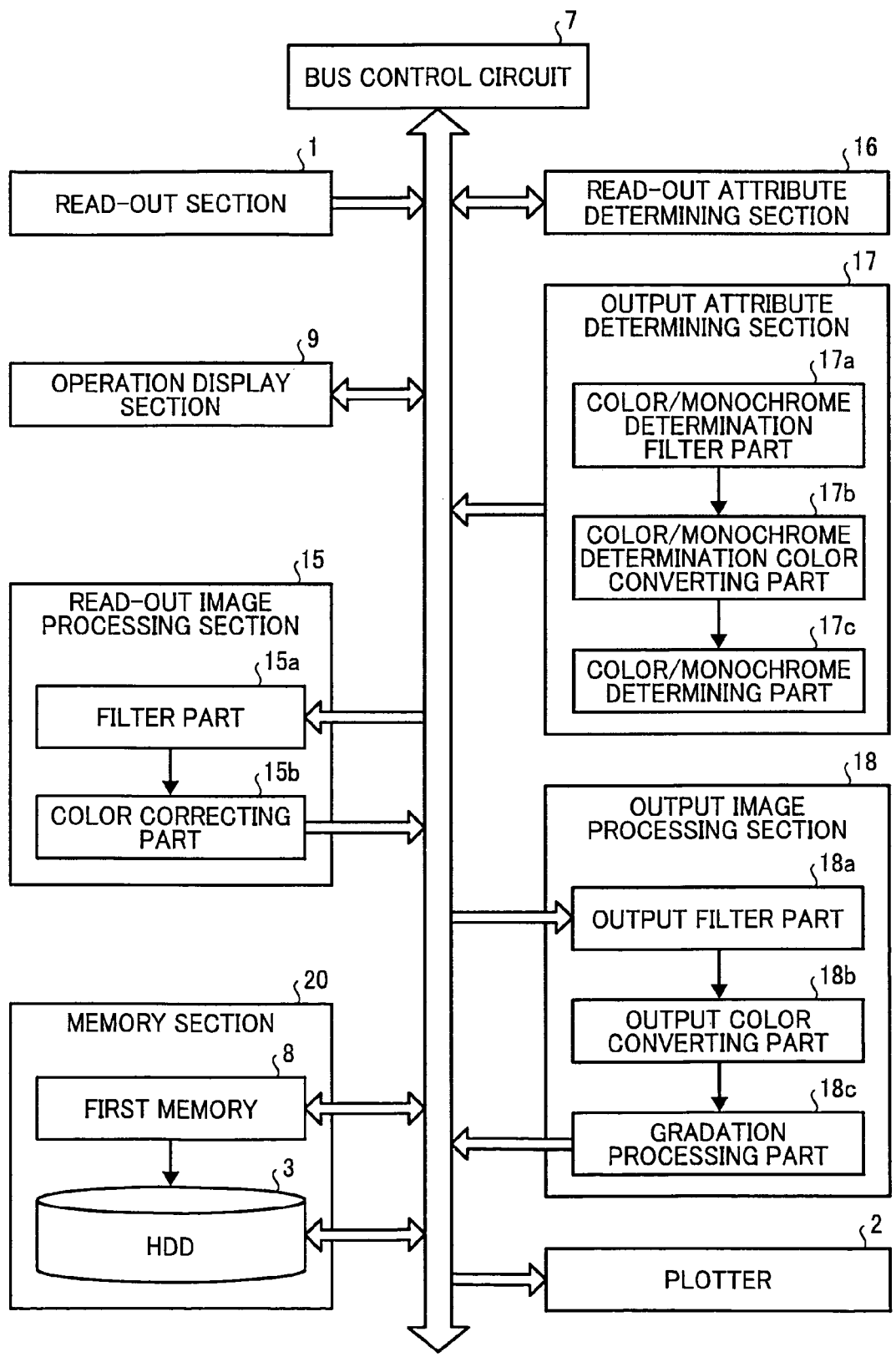
FIG. 18 is a block diagram showing the functional configuration of the MFP according to the second embodiment with focusing on image data processing.

FIG. 18 is a block diagram showing the functional configuration of the MFP according to the second embodiment with focusing on image data processing. In FIG. 18, only shown are the read-out section 1, the read-out attribute determining section 16, the read-out image processing section 15, the memory section 20, the output attribute determining section 17, the output image processing section 18, the plotter 2, the bus control circuit 7, and the operation display section 9.

The read-out attribute determining section 16 performs a color/monochrome determination for the image data read out by the read-out section 1 for which the read-out image processing has not been performed and stores the determination result (attribute) in the first memory 8. Here, the determination result is stored in the first memory 8 in association with the image data for which the read-out image processing has been performed by the read-out image processing section 15.

As correspondence coordination between the image data and the attribute as the determination result, other than using a table in which the image data and the attribute are associated with each other, can be configured a registration of the attribute in a header portion (for example, a header portion of a Jpeg image) of the image data or registration of the attribute in an Exif corresponding to the image data in the case where the image data is an image-photographed by a digital camera.

In addition, the image data for which the read-out image processing has been performed and the attribute may be configured to be stored in an SD card 6 through the external I/F circuit 4, other than being configured to be stored in the first memory 8.

In addition, as the determination of the attribute of the image data, other than the color/monochrome determination, the read-out attribute determining section 16 may be configured so as to determine attributes such as a text document, a photograph document, a text and photograph document, and a white-sheet document.

The technique of determining the color/monochrome in the read-out attribute determining section 16 is performed similarly to the process of the color/monochrome determining part 17*c* in the output attribute determining section 17 described in the first embodiment.

The function and the configuration of the output attribute determining section 17 are the same as those of the first embodiment. However, in this embodiment, when a designation for output is made by a user, in a case where the attribute of the image data determined by the read-out attribute determining section 16 is color and partial output designation is made by the user, the attribute of the range of the image data that is designated by the partial output designation is determined based on the image data designated to be output.

Next, image processing according to this embodiment configured as above will be described. FIG. 19 is a flowchart showing the sequence of the image processing according to the second embodiment.

First, an image of a document is read out by the read-out section 1 (Step S11), and the read-out image data is stored in the first memory 8. For this image data, performed in parallel are a read-out image processing (Steps S12 and S13) performed by the read-out image processing section 15 and a read-out attribute determining process performed by the read-out attribute determining section 16, that is, the color/monochrome determination (Step S51). Accordingly, the read-out attribute determining process is performed for the image data on which the read-out image processing has not been performed. The read-out image processing performed by the read-out image processing section 15 is the same as that in the first embodiment.

Then, the read-out image processing section 15 stores the image data on which the read-out image processing has been performed in the first memory 8 of the memory section 20, and the read-out attribute determining section 16 stores the determination result (whether the data is color or monochrome) of the attribute of the image data in the first memory 8 in association with the image data (Step S14).

When receiving a direction for outputting the image data from a user, the output attribute determining section 17 determines whether partial output designation such as output range designation is made by the user together with the direction for output (Step S15). When the partial output designation is not made (No in Step S15), the output image processing section 18 reads out the image data directed to be output out of the image data stored in the first memory 8, and, similarly to the first embodiment, performs output image processing (Steps S21 to S23), and the image data on which the output image process has been performed is output to the plotter 2 (Step S46).

Back to Step S15, when partial output designation is made by the user (Yes in Step S15), the output attribute determining section 17 acquires the determination result of the attribute corresponding to the image data directed to be output from the first memory 8 and determines whether the attribute of the image data directed to be output is color (Step S16). Then, when the attribute is monochrome (No in Step S16), output image processing is performed for the range of the image data that is designated by the partial output designation out of the image data directed to be output (Steps S21 to S23), and the processed image data is output to the plotter 2 (Step S46).

Back to Step S16, when the attribute is determined to be color (Yes in Step S16), similar to the first embodiment, the output image processing (Steps S31 to S33) using the output image processing section 18, and the attribute determination processing (Steps S41 to S43) using the output attribute determining section 17 are performed in parallel for the range of the image data that is designated by the partial output designation out of the image data directed to be output.

Then, the output image processing section 18 acquires the attribute as the determination result from the output attribute determining section 17 and selects the image data corresponding to the attribute from the first memory based on whether the determined attribute is color or monochrome and the like (Step S45). Then, the plotter 2 outputs the selected image data (Step S46).

Next, the above-described image processing will be described in detail on a major MFP function exemplified. In the example described below, designation of the output range of the image data as the partial output designation will be described as an example.

Copy Operation

A document is scanned by the read-out section 1, and digital image data of RGB each formed by 8 bits is stored in the first memory 8 through the PCI bus and the bus control circuit 7. At this time, the image data of RGB each formed by 8 bits stored in the first memory 8 may be configured to be stored in the HDD 3 in a case where the user desires to store the data therein (storage of data). The data of RGB each formed of 8 bits that is stored in the first memory 8 is transmitted to the read-out attribute determining section 16 and the read-out image processing section 15. The read-out attribute determining section 16 determines whether the image read out by the read-out section 1 is a color document or a monochrome document (color/monochrome determination) and stores the determination result in the first memory 8.

In a case where the output setting is made so as not to change the output image range by the user using the operation display section 9, in other words, in a case where a partial output direction is not made by the user; or in a case where the partial output designation such as a change in the output image range or the like is made by the user but the attribute determined by the read-out attribute determining section 16 is monochrome, the processed data of RGB each formed by 8 bits that is stored in the first memory 8 is output to the output image processing section 18. The output image processing section 18 performs color output processing or monochrome output processing based on the result determined by the read-out attribute determining section 16 so as to store the processed data again in the first memory 8. At this time, the image data of CMYK each formed by 2 bits stored in the first memory 8 may be stored in the HDD 3 in a case where the user desires to store the data therein (storage of data).

In a case where the output image range is changed by the operation display section 9, in other words, in a case where a partial output direction is made by the user and the attribute determined by the read-out attribute determining section 16 is color, the processed image data of RGB each formed of 8 bits that is stored in the first memory 8 is output to the output image processing section 18 and the output attribute determining section 17. At this time, the output image processing section 18 performs two types of image processing including color image processing and monochrome image processing, and stores the image after each processing in the first memory 8. The output attribute determining section 17 determines the color/monochrome determination within the output range set by the operation display section 9, and stores the determination result in the first memory 8. A determination is performed on the validness of one of the data, on which the color image processing has been performed, and the data, on which the monochrome image processing has been performed, that have been stored immediately before based on the determination result obtained from the output attribute determining section 17. Then, the data after the process that is determined to be valid is selected, and the image data that is determined to be invalid is deleted from the first memory 8.

The image data of CMYK each formed of 2 bits that is stored in the first memory 8 is transmitted to the plotter 2 through the PCI bus and the bus control circuit 7. The plotter 2 outputs the received image data of CMYK each formed of two bits to a transfer sheet, whereby generating a copy of the document.

Scanner Operation

A document is scanned by the read-out section 1, and digital image data of RGB each formed by 8 bits is stored in the first memory 8 through the PCI bus and the bus control circuit 7. At this time, the image data of RGB each formed by 8 bits inside the first memory 8 may be stored in the HDD 3 in a case where the user desires to store the data therein (data storage). The CPU 10 sets the process according to the user's desired mode into the read-out image processing section 15.

The image data of RGB each formed by 8 bits that is stored in the first memory 8 is transmitted to the read-out image processing section 15 and the read-out attribute determining section (the color/monochrome determining section) 16. The read-out attribute determining section 16 determines whether the image read out by the read-out section 1 is a color document or a monochrome document and stores the determination result in the first memory 8.

In a case where the output setting is made so as not to change the output image range by the user using the operation display section 9, in other words, in a case where partial output designation direction is not made by the user; or in a case where partial output designation such as a change in the output image range or the like is made by the user but the attribute determined by the read-out attribute determining section 16 is monochrome; the data of RGB each formed by 8 bits that is stored in the first memory 8 is transmitted to the output image processing section 18. The output image processing section 18 performs color output processing or monochrome output processing based on the result determined by the read-out attribute determining section 16, and stores the processed data again in the first memory 8. At this time, the image data of CMYK each formed by two bits inside the first memory 8 may be stored in the HDD 3 in a case where the user desires to store the data therein (data storage). The image data of RGB each formed by 8 bits that is stored in the first memory 8 is transmitted to a network through the bus control circuit 7, the AGP bus, the N.B. 11, the PCI bus, and the external I/F circuit 4 and is to be delivered to an external server or the external input device 5, whereby scanner transmission is performed.

Printer Operation

For example, printer driver software of the external input device 5 generates digital image data of CMYK each formed by two bits by rendering an electronic document designated to be printed. The external input device 5 transmits a print request and the generated digital image data of CMYK each formed by two bits to the MFP through a network.

When receiving control command data of the print request from the external input device 5, the CPU 10 sequentially performs necessary settings and operations by executing a program of a printer operation process. The digital image data of CMYK each formed by two bits transmitted from the external input device 5 through the network is stored in the first memory 8. Then, the digital image data is transmitted to the plotter 2. The plotter 2 outputs an image represented by the received image data to a transfer sheet. In other words, the image is printed out.

As above, according to this embodiment, after the read-out attribute determining section 16 determines the attribute of the image data on which the read-out image processing has not been performed, that is, the original image data generated by reading out a document or by photographing, the read-out image processing is performed. Then, when the image data is re-used, the determination result of the read-out attribute determination is referred to, and then the output attribute determination and the output image processing are performed for output. Accordingly, since an appropriate attribute determination can be performed in accordance with the conditions of document reading or photographing, the image quality can be further improved without increasing the scale of the hardware.

In addition, in the above-described first and second embodiments, described are examples in which the image forming device according to the invention is applied to a multi-function printer that has at least two functions of a copy function, a scanner function, and a facsimile function. However, the invention can be also applied to an image processing apparatus such as a copy machine, a printer, a scanner device, and a facsimile device.

In addition, in both first and second embodiments, the image data generated by the read-out section 1 is processed for image output. However, according to the invention, for example, there can also be an embodiment in which the image data generated by photographing using a digital camera is input to the external I/F circuit 4 from the digital camera through a memory medium or from an external terminal such as a PC or is directly input to the bus control circuit 7, and the image data is processed as input image data that is changed to the image data output from the read-out section 1. It is preferable that such an embodiment is disposed in parallel with the read-out section 1.

In addition, an image processing program that is executed by the MFP of the above-described first or second embodiment is provided with being recorded in a ROM or the like in advance.

The image processing program that is executed by the MFP according to the above-described first or second embodiment may be configured to be provided by being recorded on a computer-readable recording medium such as a CD-ROM, a flexible disk (FD), a CD-R, a Digital Versatile Disk (DVD) or a magnetic tape as an installable format file or an executable format file.

Furthermore, the image processing program executed by the MFP according to the above-described first or second embodiment can be provided by being stored on a computer that is connected to a network such as the Internet and being downloaded via the network. In addition, the image processing program executed by the MFP according to the above-described first or second embodiment may be configured to be provided or distributed via a network such as the Internet.

The image processing program that is executed by the MFP according to the above-described first or second embodiment is configured to have modules including the above-described sections (the read-out image processing section 15, the output attribute determining section 17, the output image processing section 18, and the read-out attribute determining section 16). Thus, as actual hardware, the CPU (processor) reads out the image processing program from the ROM and executes the image processing program, and accordingly, each section is loaded into a main memory device, whereby the read-out image processing section 15, the output attribute determining section 17, the output image processing section 18, and the read-out attribute determining section 16 are generated on the main memory device.

According to embodiments of the invention, the attribute determination of an image represented by image data can be performed with high accuracy. Furthermore, even in a case where a partial range of the read-out image is to be output, the attribute determination for the output range after change can be accurately performed. This results in improvement in the user convenience.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus comprising:
a memory unit;
a read-out image processing unit configured to perform read-out image processing on input image data and store the image data on which the image processing has been performed in the memory unit;
an output attribute determining unit configured to perform determination image processing on the image data stored in the memory unit and determine an attribute of the image data on which the determination image processing has been performed;
an output image processing unit configured to perform output image processing on the image data according to the determined attribute; and
an output unit configured to output the image data on which the output image processing has been performed by the output image processing unit,
wherein the output attribute determining unit is further configured to,
inversely convert the image data stored in the memory unit into the image data that is before the image processing performed by the read-out image processing unit as the determination image processing,
determine an attribute of the inversely converted image data, and
wherein the output attribute determining unit is configured to inversely convert the image data stored in the memory unit into the image data that is before the image processing performed by the read-out image processing unit by performing a filtering process and a color conversion process.

2. The image processing apparatus according to claim 1, further comprising:
a reception unit configured to receive partial output designation indicating to delete part of the image data stored in the memory unit and output resultant image data,
wherein the output attribute determining unit, when the partial output designation is received, is further configured to perform the determination image processing on a part of the image data that is stored in the memory unit and designated to be partially output, and determine an attribute of the image data on which the determination image processing has been performed.

3. The image processing apparatus according to claim 2, wherein
the reception unit is further configured to receive any one of designations of an output range of the image data stored in the memory unit, enlargement designation of the image data stored in the memory unit, designation of masking a partial range of the image data stored in the memory unit, and designation of a sheet having a size smaller than a read-out document as the partial output designation.

4. The image processing apparatus according to claim 1, further comprising:
a read-out attribute determining unit configured to
perform determination image processing on the input image data,
determine the input image data that is processed with the determination image processing, and
store a determined attribute in the memory unit in association with the image data on which the read-out image processing has been performed.

5. The image processing apparatus according to claim 4, further comprising:
a reception unit configured to receive partial output designation indicating to delete part of the image data stored in the memory unit and output resultant image data,
wherein the output image processing unit, when the partial output designation is not received, is configured to perform the output image processing on the image data stored in the memory unit according to the attribute of the image data that is stored in the memory unit.

6. The image processing apparatus according to claim 5, wherein
the output attribute determining unit, when the partial output designation is received is further configured to,
perform the determination image processing on a part of the image data that is stored in the memory unit and designated to be partially output, and
determine an attribute of the image data on which the determination image processing has been performed.

7. The image processing apparatus according to claim 1, wherein the attribute determination process performed by the output attribute determining unit and the output image processing performed by the output image processing unit are performed in parallel.

8. The image processing apparatus according to claim 7, wherein
the output image processing unit is configured to
separately perform a plurality of output image processings different for each attribute on the image data to generate a plurality of image data on which different output image processings have been performed,
acquire the attribute determined by the output attribute determining unit, and
select the image data, on which the output image processing corresponding to the attribute determined by the output attribute determining unit has been performed, out of the plurality of generated image data, and
the output unit is configured to output the selected image data.

9. The image processing apparatus according to claim 1, wherein the output attribute determining unit is configured to determine whether the image data is a monochrome image or a color image as the attribute of the image data.

10. The image processing apparatus according to claim 1, wherein the output attribute determining unit is configured to determine whether the image data is a text image, a photograph image, a text and photograph image, or a blank image as the attribute of the image data.

11. A method of processing an image that is executed by an image processing apparatus including a memory unit, the method comprising:
performing read-out image processing on input image data;
storing the image data on which the image processing has been performed in the memory unit;
performing determination image processing on the image data that is stored in the memory unit;
determining an attribute of the image data on which the determination image processing has been performed;

performing output image processing on the image data in accordance with the determined attribute; and outputting the image data on which the output image processing has been performed at the output image processing, wherein the determining the attribute includes, inversely converting the image data stored in the memory unit into the image data that is before the image processing performed by the read-out image processing unit as the determination image processing by the output attribute determining unit, determining, by the output attribute determining unit, an attribute of the inversely converted image data, and the inversely converting includes performing a filtering process and a color conversion process.

12. A computer program product comprising a non-transitory computer-usable medium having computer-readable program codes embodied in the medium for processing information in an image processing apparatus including a memory unit, the program codes when executed causing a computer to execute:

performing read-out image processing on input image data;

storing the image data on which the image processing has been performed in the memory unit;

performing determination image processing on the image data that is stored in the memory unit;

determining an attribute of the image data on which the determination image processing has been performed;

performing output image processing on the image data in accordance with the determined attribute; and outputting the image data on which the output image processing has been performed at the output image processing, wherein the determining the attribute includes, inversely converting the image data stored in the memory unit into the image data that is before the image processing performed by the read-out image processing unit as the determination image processing, determining, by the output attribute determining unit, an attribute of the inversely converted image data, and the inversely converting includes performing a filtering process and a color conversion process.

\* \* \* \* \*